US012524768B2

(12) United States Patent
Rule et al.

(10) Patent No.: US 12,524,768 B2
(45) Date of Patent: *Jan. 13, 2026

(54) ON-DEMAND APPLICATIONS TO EXTEND WEB SERVICES

(71) Applicant: Capital One Services, LLC, McLean, VA (US)

(72) Inventors: Jeffrey Rule, Chevy Chase, MD (US); Bob Uni Koshy, Henrico, VA (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,220

(22) Filed: Mar. 12, 2024

(65) Prior Publication Data

US 2024/0296455 A1    Sep. 5, 2024

Related U.S. Application Data

(63) Continuation of application No. 17/235,082, filed on Apr. 20, 2021, now Pat. No. 11,961,089.

(51) Int. Cl.
*G06Q 20/40* (2012.01)
*G06F 8/60* (2018.01)
(Continued)

(52) U.S. Cl.
CPC ........... *G06Q 20/4018* (2013.01); *G06F 8/60* (2013.01); *G06Q 20/352* (2013.01);
(Continued)

(58) Field of Classification Search
CPC ............. G06Q 20/4018; G06Q 20/352; G06Q 20/382; G06F 8/60; H04L 9/3228; H04L 67/02

See application file for complete search history.

(56) References Cited

U.S. PATENT DOCUMENTS 5,590,038 A    12/1996  Pitroda
5,666,415 A     9/1997  Kaufman
(Continued)

FOREIGN PATENT DOCUMENTS

CN    101192295 A    6/2008
GB      2516861 A    2/2015
(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
(Continued)

*Primary Examiner* — Patrick McAtee
*Assistant Examiner* — Zesheng Xiao
(74) *Attorney, Agent, or Firm* — KDW Firm PLLC

(57) ABSTRACT

Systems, methods, articles of manufacture, and computer-readable media. A web browser of a device may receive selection of a uniform resource locator (URL). An operating system may download an application from an application server based on the URL. The application may identify a plurality of applications installed on the device and select a first institution corresponding to a first application. The application may receive a cryptogram from a contactless card associated with the first institution and transmit the cryptogram to an authentication server. The application may receive an authentication result specifying the authentication server decrypted the cryptogram. The web browser may receive, based on the decryption of the cryptogram, an account number, an expiration date associated with the account number, and a card verification value (CVV) asso-
(Continued)

ciated with the account number. The web browser may provide the account number, expiration date, and CVV to a server associated with the application.

20 Claims, 15 Drawing Sheets

(51) Int. Cl.
*G06Q 20/34* (2012.01)
*G06Q 20/38* (2012.01)
*H04L 9/32* (2006.01)
*H04L 67/02* (2022.01)

(52) U.S. Cl.
CPC ......... *G06Q 20/382* (2013.01); *H04L 9/3228* (2013.01); *H04L 67/02* (2013.01)

(56) References Cited

U.S. PATENT DOCUMENTS

| | | |
|---|---|---|
| 6,199,114 B1 | 3/2001 | White |
| 6,324,271 B1 | 11/2001 | Sawyer |
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | Von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,511,547 B2 | 8/2013 | Rans |
| 8,519,822 B2 | 8/2013 | Riegebauer |
| 8,750,514 B2 | 6/2014 | Gallo |
| 8,870,081 B2 | 10/2014 | Olson |
| 9,038,893 B2 | 5/2015 | Kirkham |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1* | 10/2021 | Ho .................. G06Q 20/382 |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2002/0032662 A1* | 3/2002 | Maclin ............... G06Q 20/385 705/64 |
| 2003/0065643 A1* | 4/2003 | Musgrove ............ G06F 16/951 |
| 2003/0220876 A1 | 11/2003 | Burger |
| 2005/0149512 A1* | 7/2005 | Ruthfield ............. G06F 3/0481 |
| 2005/0156026 A1 | 7/2005 | Ghosh |
| 2005/0228997 A1 | 10/2005 | Bicker |
| 2005/0269402 A1 | 12/2005 | Spitzer |
| 2007/0276765 A1 | 11/2007 | Hazel |
| 2008/0082452 A1 | 4/2008 | Wankmueller |
| 2008/0099552 A1 | 5/2008 | Grillion |
| 2009/0143104 A1 | 6/2009 | Loh |
| 2009/0235339 A1 | 9/2009 | Mennes |
| 2009/0282264 A1 | 11/2009 | Amiel |
| 2011/0113245 A1 | 5/2011 | Varadarajan |
| 2011/0155801 A1 | 6/2011 | Rowberry |
| 2012/0143703 A1 | 6/2012 | Wall |
| 2013/0030997 A1 | 1/2013 | Spodak |
| 2013/0146657 A1 | 6/2013 | Graef |
| 2013/0159195 A1* | 6/2013 | Kirillin ................ H04L 63/105 705/71 |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0365377 A1 | 12/2014 | Salama |
| 2015/0032635 A1 | 1/2015 | Guise |
| 2015/0073983 A1 | 3/2015 | Bartenstein |
| 2015/0113271 A1 | 4/2015 | Jooste |
| 2015/0127529 A1* | 5/2015 | Makhotin ............ G06Q 20/322 705/39 |
| 2015/0134513 A1 | 5/2015 | Olson |
| 2015/0199673 A1 | 7/2015 | Savolainen |
| 2015/0199863 A1 | 7/2015 | Scoggins |

(56) References Cited

U.S. PATENT DOCUMENTS

| | | |
|---|---|---|
| 2015/0254637 A1 | 9/2015 | Yang |
| 2015/0317295 A1 | 11/2015 | Sherry |
| 2015/0356560 A1 | 12/2015 | Shastry et al. |
| 2016/0026997 A1* | 1/2016 | Tsui ............... G06Q 20/322 705/44 |
| 2016/0078430 A1 | 3/2016 | Douglas |
| 2016/0189143 A1 | 6/2016 | Koeppel |
| 2016/0253651 A1 | 9/2016 | Park |
| 2016/0277383 A1 | 9/2016 | Guyomarc'h |
| 2016/0307189 A1 | 10/2016 | Zarakas |
| 2016/0314472 A1 | 10/2016 | Ashfield |
| 2016/0379217 A1 | 12/2016 | Hammad |
| 2017/0017957 A1 | 1/2017 | Radu |
| 2017/0039566 A1 | 2/2017 | Schipperheijn |
| 2017/0068950 A1 | 3/2017 | Kwon |
| 2017/0330173 A1 | 11/2017 | Woo |
| 2018/0039987 A1 | 2/2018 | Molino |
| 2018/0268132 A1 | 9/2018 | Buer |
| 2018/0300716 A1 | 10/2018 | Carlson |
| 2019/0172055 A1 | 6/2019 | Hale |
| 2019/0303945 A1 | 10/2019 | Mitra |
| 2020/0242588 A1 | 7/2020 | Rule et al. |
| 2021/0004806 A1 | 1/2021 | Noe |
| 2021/0035086 A1* | 2/2021 | Khan ............... G06Q 20/204 |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| GB | 2551907 A | 1/2018 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2020160065 A1 | 8/2020 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

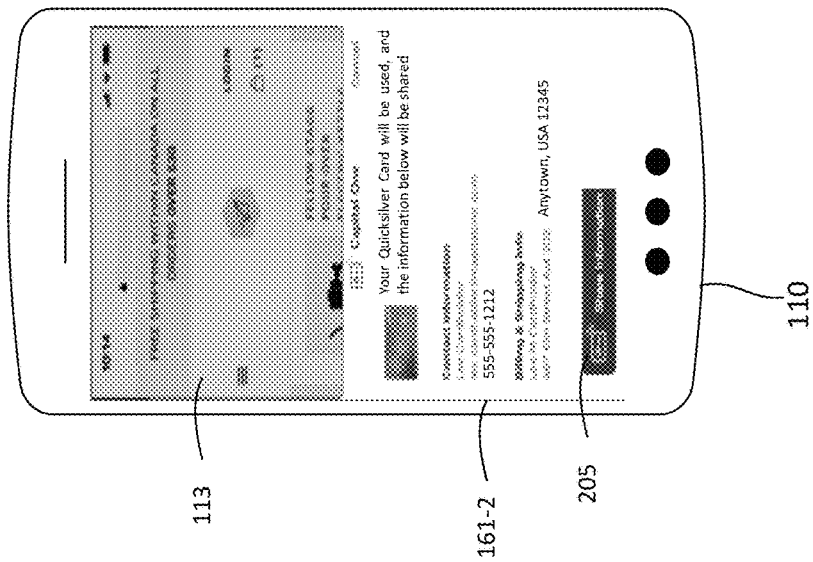
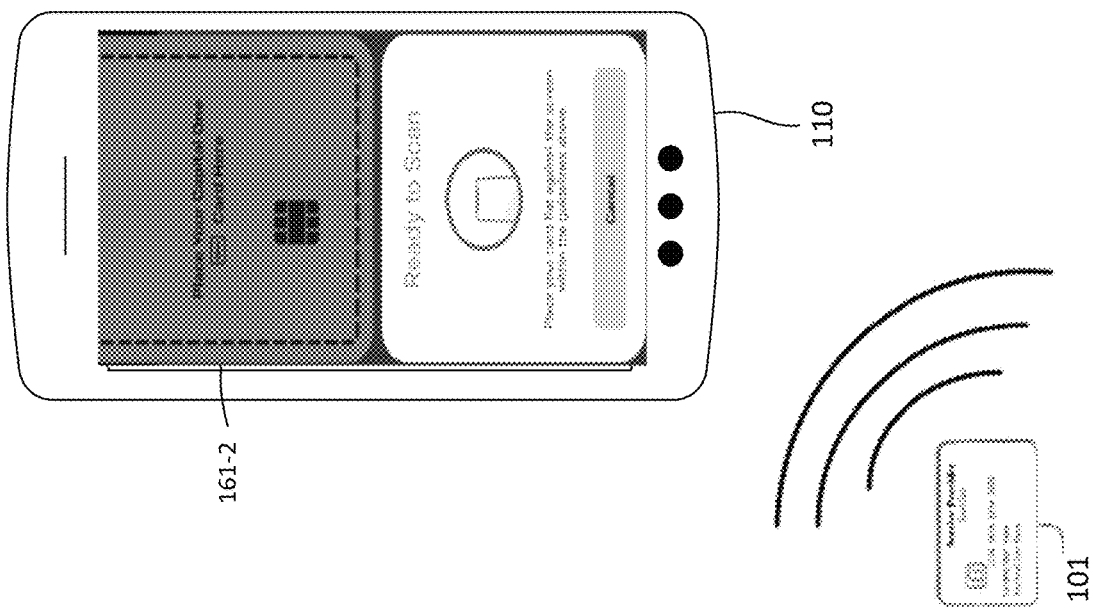
FIG. 2D
FIG. 2C

ON-DEMAND APPLICATIONS TO EXTEND WEB SERVICES

CROSS-REFERENCE TO RELATED APPLICATIONS

This application claims priority to and is a continuation of U.S. patent application Ser. No. 17/235,082 entitled "ON-DEMAND APPLICATIONS TO EXTEND WEB SERVICES" filed on Apr. 20, 2021. The contents of the aforementioned patent application are incorporated herein by reference in their entirety.

TECHNICAL FIELD

Embodiments disclosed herein generally relate to computing platforms, and more specifically, to computing platforms for using on-demand applications to extend web-based services.

BACKGROUND

Some web-based platforms host web pages for different entities. However, the functionality provided by a given web page may be limited relative to the functionality provided by a dedicated application store application for a given entity. For example, the web page may not be able to securely process customer data and/or requests. This problem is often exacerbated when mobile web browsers are used to access the web pages, as mobile web browsers may have limited functionality compared to other types of web browsers. Therefore, security and other risks may exist using services provided by web-based platforms.

SUMMARY

Embodiments disclosed herein provide systems, methods, articles of manufacture, and computer-readable media for using on-demand applications to extend web services. In one example, a web browser of a device may receive selection of a uniform resource locator (URL). An operating system may download an application from an application server based on the URL. The application may identify a plurality of applications installed on the device and select a first institution corresponding to a first application. The application may receive a cryptogram from a contactless card associated with the first institution and transmit the cryptogram to an authentication server. The application may receive an authentication result specifying the authentication server decrypted the cryptogram. The web browser may receive, based on the decryption of the cryptogram, an account number, an expiration date associated with the account number, and a card verification value (CVV) associated with the account number. The web browser may provide the account number, expiration date, and CVV to a server associated with the application.

BRIEF DESCRIPTION OF THE DRAWINGS

FIGS. 2A-2E illustrate embodiments of a system.

DETAILED DESCRIPTION

Figure 1A:
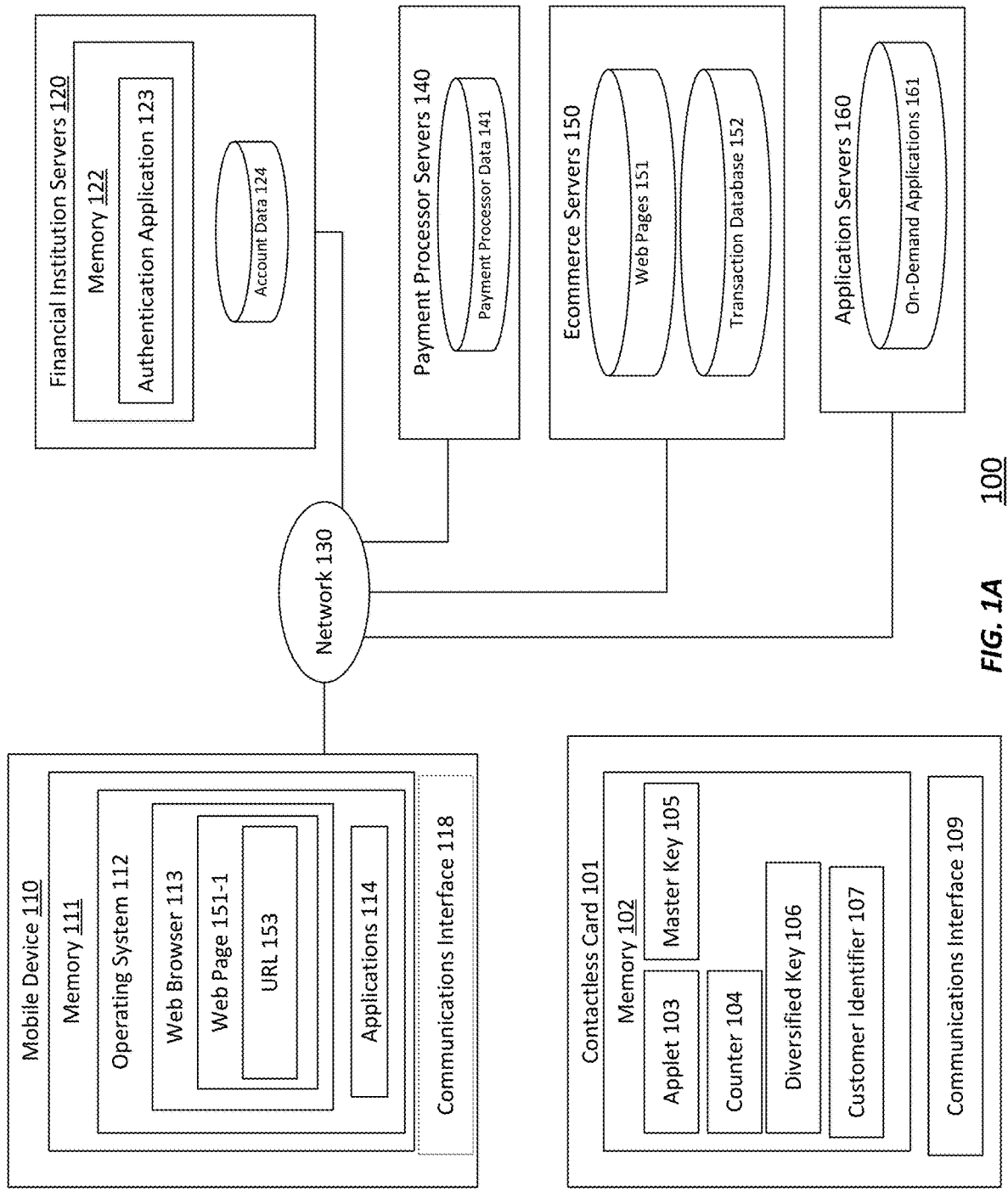
FIGS. 1A-1E illustrate embodiments of a system.

Embodiments disclosed herein provide techniques for extending web services using on-demand applications. Generally, the web services may include a plurality of web pages hosted by an ecommerce platform. Each web page may be associated with a respective merchant, of a plurality of merchants, that have a presence on the ecommerce platform. When a user accesses one of the web pages using a web browser on a device, the user may select one or more items for purchase. To improve the security of the checkout process, embodiments disclosed herein may present, in the web page, a uniform resource locator (URL) that is directed to an application hosted by an application server. The URL may include one or more additional parameters, such as a merchant identifier (e.g., a merchant identifier associated with the web page), a cart identifier for the transaction, and/or any other data element. The application may be an on-demand application associated with the ecommerce platform that processes payment for the purchase. Responsive to selection of the URL, the web browser and/or an operating system (OS) of the device may access the URL. Doing so may cause the on-demand application to be downloaded and executed on the device.

The on-demand application may then identify one or more applications installed on the device. The applications may include one or more financial institution applications. The on-demand application may then select a first financial institution application from the one or more applications. A user may provide their email address as input to the on-demand application. The on-demand application may then transmit the email address to a server of a financial institution associated with the first financial institution application. The server may use the email address to identify a phone number associated with an account in an account database. The server may then transmit a one-time passcode (OTP) to the identified phone number. Once received, the user may provide the OTP to the on-demand application. The on-demand application may compare the OTP provided by a user to an instance of the OTP received from the server.

If the comparison results in a match, the on-demand application may instruct the user to tap a contactless card to the device. In response, the user may tap the contactless card to the device, and the on-demand application may operate a card reader of the device. Doing so may cause or instruct the contactless card to generate a cryptogram, which may be included as part of a data package, such as an NFC Forum Data Exchange Format (NDEF) file. The on-demand application may read the data package via NFC and transmit the data package to the server for decryption. In some embodiments, the on-demand application may transmit additional metadata, such as the cart identifier, merchant identifier, etc., with the data package. The server may attempt to decrypt the cryptogram using the received data package.

If the server decrypts the cryptogram, the server may send a response to the on-demand application. The response may include an indication that the cryptogram was decrypted or otherwise authenticated. Furthermore, if the server decrypts the cryptogram, the server may generate payment information for the purchase in the web browser. The payment information may include a virtual account number (VAN), expiration date, card verification value (CVV) and any other information such as the user's address, etc. The server may provide the payment information to the web server. The web server may then push the payment information to the web browser, which may then fill the payment information into one or more form fields in the web browser. The web browser may then be used to submit the payment for the purchase using the payment information.

In some embodiments, a cookie may be stored on the device, e.g., by the on-demand application responsive to the decryption of the cryptogram by the server, and/or by the web browser responsive to receiving the payment information. The cookie may be used to authenticate the user for subsequent transactions. For example, if the user attempts to make a second purchase, the user may again select the URL to use the on-demand application. The on-demand application may be downloaded (if not available on the device) and executed. The on-demand application may identify the cookie stored on the device. The on-demand application may identify the first financial institution based on the cookie, and instruct the server associated with the first financial institution to generate another VAN, expiration date, and CVV. Advantageously, based on the identification of the cookie, the user is not required to tap the card to the device to facilitate decryption of another cryptogram by the server. The another VAN, expiration date, and CVV may then be used to complete the second purchase.

Advantageously, embodiments disclosed herein provide techniques to extend web services using on-demand applications. Because an ecommerce platform may host web sites provided by thousands (or more) of merchants, the ecommerce platform cannot reasonably provide a dedicated application to each merchant. However, by leveraging an on-demand application, the ecommerce platform may extend the functionality provided by web pages. Doing so may include expedited payment processing by using payment information that is automatically downloaded and inserted into one or more payment forms. By leveraging cryptograms generated by contactless cards, embodiments of the disclosure may securely verify the identity of the user with minimal risk of fraudulent activity. Furthermore, by using a web browser, a dedicated client application is not required to engage in data communications with the contactless card. Using a web browser may advantageously scale the functionality described herein to different entities and any number of users without requiring a dedicated application. Furthermore, by providing a simplified payment process, more transactions may be processed by the server, thereby improving system performance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary system 100, consistent with disclosed embodiments. Although the system 100 shown in FIGS. 1A-1E has a limited number of elements in a certain topology, it may be appreciated that the system 100 may include more or less elements in alternate topologies as desired for a given implementation.

As shown, the system 100 comprises one or more contactless cards 101, one or more computing devices 110, one or more financial institution servers 120, one or more payment processor servers 140, one or more ecommerce servers 150, and one or more application servers 160. The contactless card 101 is representative of any type of payment card, such as a credit card, debit card, ATM card, gift card, and the like. The contactless card 101 may comprise one or more communications interfaces 109, such as a radio frequency identification (RFID) chip, configured to communicate with a communications interface 118 (also referred to herein as a "card reader", a "wireless card reader", and/or a "wireless communications interface") of the computing devices 110 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 110 is representative of any number and type of computing device, such as smartphones, tablet computers, wearable devices, laptops, portable gaming devices, virtualized computing system, merchant terminals, point-of-sale systems, servers, desktop computers, and the like. The servers 120, 140, 150, and 160 are representative of any number and type of computing devices, such as a server, workstation, compute cluster, cloud computing platform, virtualized computing system, and the like. Although not depicted for the sake of clarity, the computing device 110, contactless card 101, and servers 120, 140, 150, and 160 each include one or more processor circuits to execute programs, code, and/or instructions.

As shown, a memory 102 of the contactless card 101 includes an applet 103, a counter 104, a master key 105, a diversified key 106, and a unique customer identifier (ID)

107. The applet 103 is executable code configured to perform the operations described herein. The counter 104, master key 105, diversified key 106, and customer ID 107 are used to provide security in the system 100 as described in greater detail below.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes a web browser 113 and one or more applications 114. The web browser 113 is an application that allows the device 110 to access information via the network 130 (e.g., via the Internet). The applications 114 are representative of any type of application, including applications associated with one or more financial institutions and/or financial institution servers 120.

As shown, a memory 122 of the server 120 includes an authentication application 123. A given server 120 and/or authentication application 123 may be associated with a financial institution issuing a contactless card 101, e.g., a bank. Therefore, a plurality of different servers 120 and/or authentication applications 123 may exist in the system 100. As described in greater detail herein, the authentication application 123 is configured to facilitate generation of payment information for one or more contactless cards 101 via the web browser 113 and an on-demand application 161 without requiring the device 110 to include a dedicated application to read data from the contactless cards 101 and/or communicate with the financial institution servers 120. Furthermore, doing so allows the web browser 113 and/or web page 151 to process transactions without a given web page 151 including functionality to read data from the contactless cards 101 and/or communicate with the financial institution servers 120.

Generally, a user may use the web browser 113 to browse one or more web pages 151 on the ecommerce servers 150. The web pages 151 may include hypertext markup language (HTML) pages, JavaScript® pages, and/or any other type of page that can be rendered by a web browser 113. The ecommerce servers 150 may generally provide a platform for distinct merchants, or sellers, to sell goods, services, items, and the like. Therefore, each merchant is associated with at least one web page 151.

Generally, while browsing, the user may select one or more items and/or services for purchase from one or more merchants having a presence on the ecommerce platform 150. When the user has selected the desired items and/or services, the user may encounter an interface in a web page 151-1 for completing the transaction (e.g., a cart page, a checkout page, etc.) in the web browser 113. Conventionally, the user is required to manually enter their name, card number, expiration date, CVV, and/or address information into forms of web page 151-1 in the web browser 113 to complete the purchase. Furthermore, while the device 110 is capable of reading this information from the contactless card 101 via the communications interface 118, the web browser 113 and/or the web page 151-1 may not support such functionality. For example, the web browser 113 and/or the web page 151-1 may not be able to control the communications interface 118. Similarly, the web browser 113 and/or the web page 151-1 may not be able to communicate with the authentication applications 123 to leverage required security features.

Advantageously, however, the web page 151-1 may include a URL 153 that is configured to initiate secure payment processing for the transaction. Generally, the URL 153 may be directed to one of the on-demand applications 161 on the application servers 160. In some embodiments, the URL 153 may specify one or more parameters. For example, the parameters may include a merchant identifier, a transaction (or shopping cart) identifier, an identifier of the application 161, and the like. One example of a URL 153 is "http://www.example.com/app123?merchantid=abc&cartid=123", where "app123" identifies an application 161, "merchantid=abc" identifies a merchant, and "cartid=123" identifies a transaction and/or shopping cart. The merchant identifier may be a unique identifier associated with a merchant and/or a web page 151 associated with the merchant that has a presence in the ecommerce servers 150. For example, the ecommerce server 150 may host web pages 151 for example entities A, B, and C. In such an example, each entity A, B, and C is associated with a respective unique identifier. The transaction identifier uniquely identifies a given transaction (e.g., the items selected for purchase, a shopping cart, etc.) and is associated with an account on the ecommerce server 150. For example, the transaction identifier may be a unique alphanumeric identifier, a unique session alphanumeric identifier, a file, etc.

Figure 1B:
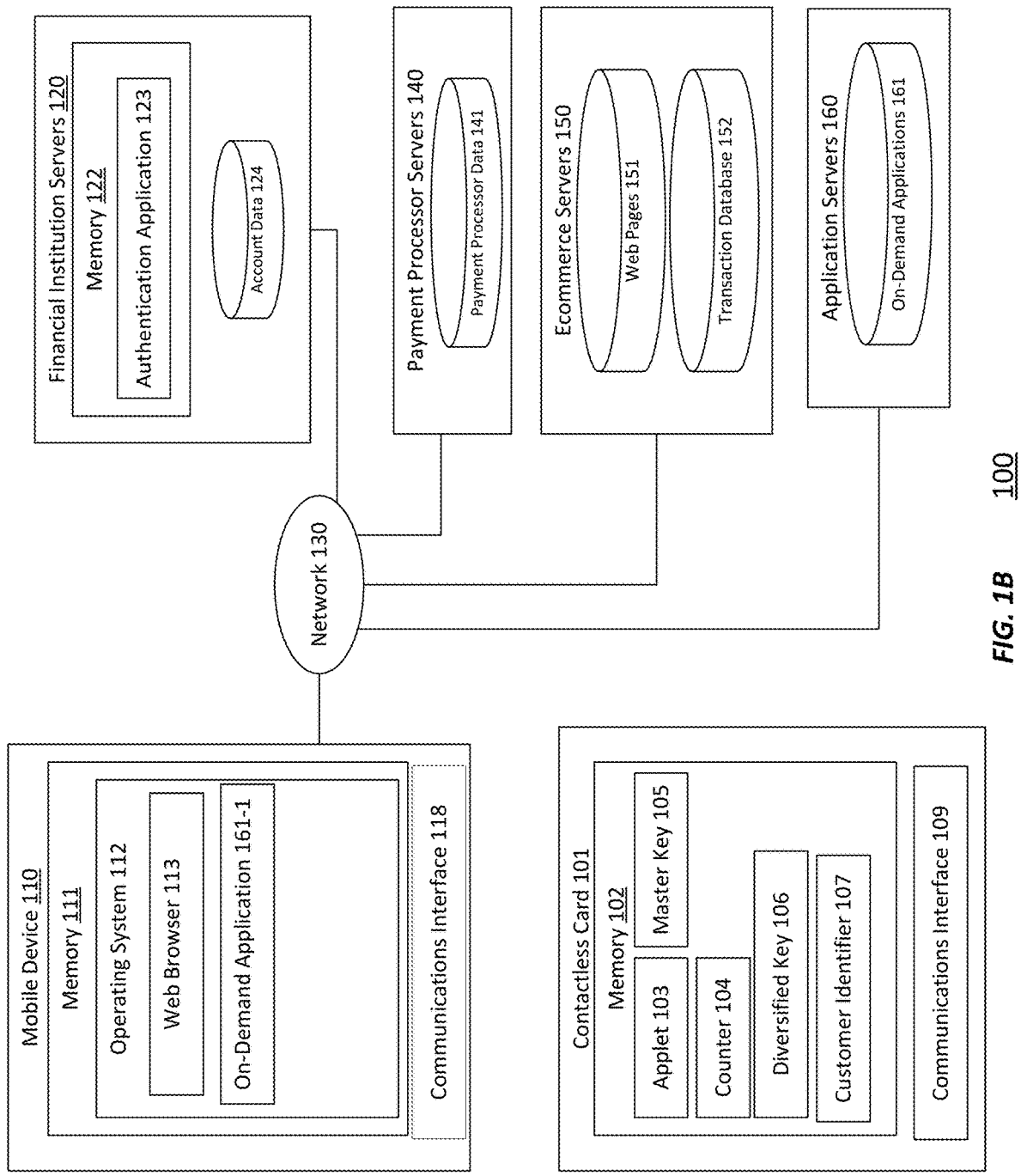

FIG. 1B depicts an embodiment where the user has selected the URL 153 in the web browser to complete the transaction using the contactless card 101 without manually entering payment information in the web browser 113 and/or the web page 151-1. Responsive to the selection of the URL 153, the OS 112 may dynamically download an on-demand application 161-1, and dynamically install the on-demand application 161-1 on the device. The URL 153 may further be a universal link URL (or deep link URL) that opens a resource (e.g., one or more specific pages of the associated on-demand applications 161). The pages of the on-demand applications 161 that should be opened upon execution on the mobile device 110 may be specified as parameters of the URL 153. Similarly, the merchant identifier and/or transaction identifier may be provided to the on-demand application 161 via parameters of the URL 153.

The on-demand applications 161 are non-persistent applications that may be dynamically downloaded and executed on the mobile device 110. Examples of on-demand applications 161 include Android® instant applications, Apple® App Clips, and progressive web applications. More generally, the on-demand applications 161 include a subset of functionality provided by an application 114 associated with the financial institution servers. For example, an on-demand application 161 may include functionality to read data from a contactless card 101 and transmit the data to an authentication application 123 on a financial institution server 120 for verification. However, the on-demand application 161 may omit other functionality provided by a complete application 114 provided by the financial institution (e.g., viewing account balances, transferring funds, etc.). In some embodiments, a given on-demand application 161 may be associated with a distinct ecommerce platform and/or server 150 of a plurality of ecommerce platforms and/or servers 150.

In the embodiment depicted in FIG. 1B, the on-demand application 161-1 may identify one or more of the applications 114 installed on the device. Doing so may allow the on-demand application 161-1 to determine the issuer of the contactless card 101. Generally, the on-demand application 161-1 may search for applications 114 associated with a financial institution and/or financial institution server 120. If one application 114 is identified, the on-demand application 161-1 may select the financial institution server 120 associated with the application. The association may be defined in a table or other data structure of the on-demand application 161-1. In embodiments where no applications 114 are identified, the on-demand application 161-1 may include a list of financial institutions (e.g., ranked based on popularity among all users), and iteratively select each financial institution (and/or associated server 120) in ranked order until the correct financial institution associated with the contactless card 101 is identified.

In embodiments where the on-demand application 161-1 identifies more than one financial institution application 114 installed on the device 110, the on-demand application 161-1 may select one of the financial institution applications 114 and the associated financial institution server 120. The on-demand application 161-1 may use any rules and/or selection logic to select one of the applications 114. For example, the on-demand application 161-1 may select the most recently used application 114, the most frequently accessed application 114, and the like. In some embodiments, the on-demand application 161-1 computes a score for each application 114, e.g., based on most recently used, most frequently used, etc. The on-demand application 161-1 may then select the application 114 with the highest score.

Once the on-demand application 161-1 selects a financial institution application 114 and/or a financial institution server 120, the on-demand application 161-1 may search for a cookie on the device 110. If a cookie is not found, the on-demand application 161-1 may instruct the user to enter their email address (or some other identifier) as part of a one-time passcode (OTP) registration flow. Once provided, the on-demand application 161-1 may transmit the email address (and/or a hash of the email address) to the selected financial institution server 120. In response, the authentication application 123 may identify a phone number associated with the email address in the account data 124.

The authentication application 123 may then generate an OTP and send the OTP to the device 110 using the identified phone number. The OTP may be any alphanumeric string. The user may then provide the OTP as input to the on-demand application 161-1. The on-demand application 161-1 may then transmit the received input to the authentication application 123, which compares the input to the generated OTP. The authentication application 123 may return a result of a comparison to the on-demand application 161-1. In some embodiments, however, the authentication application 123 provides the generated OTP to the on-demand application 161-1, which performs the comparison. Regardless of the entity performing the comparison, if the comparison results in a match, the user may be enrolled in automatic payments using the contactless card 101 on the ecommerce platform. In some embodiments, the on-demand application 161-1 may store a cookie (not pictured) responsive to the comparison resulting in the match and enrolling the user in automatic payments. If the comparison does not result in a match, the process stops and the user's request to checkout using automatic payments via the contactless card 101 is restricted.

Figure 1C:
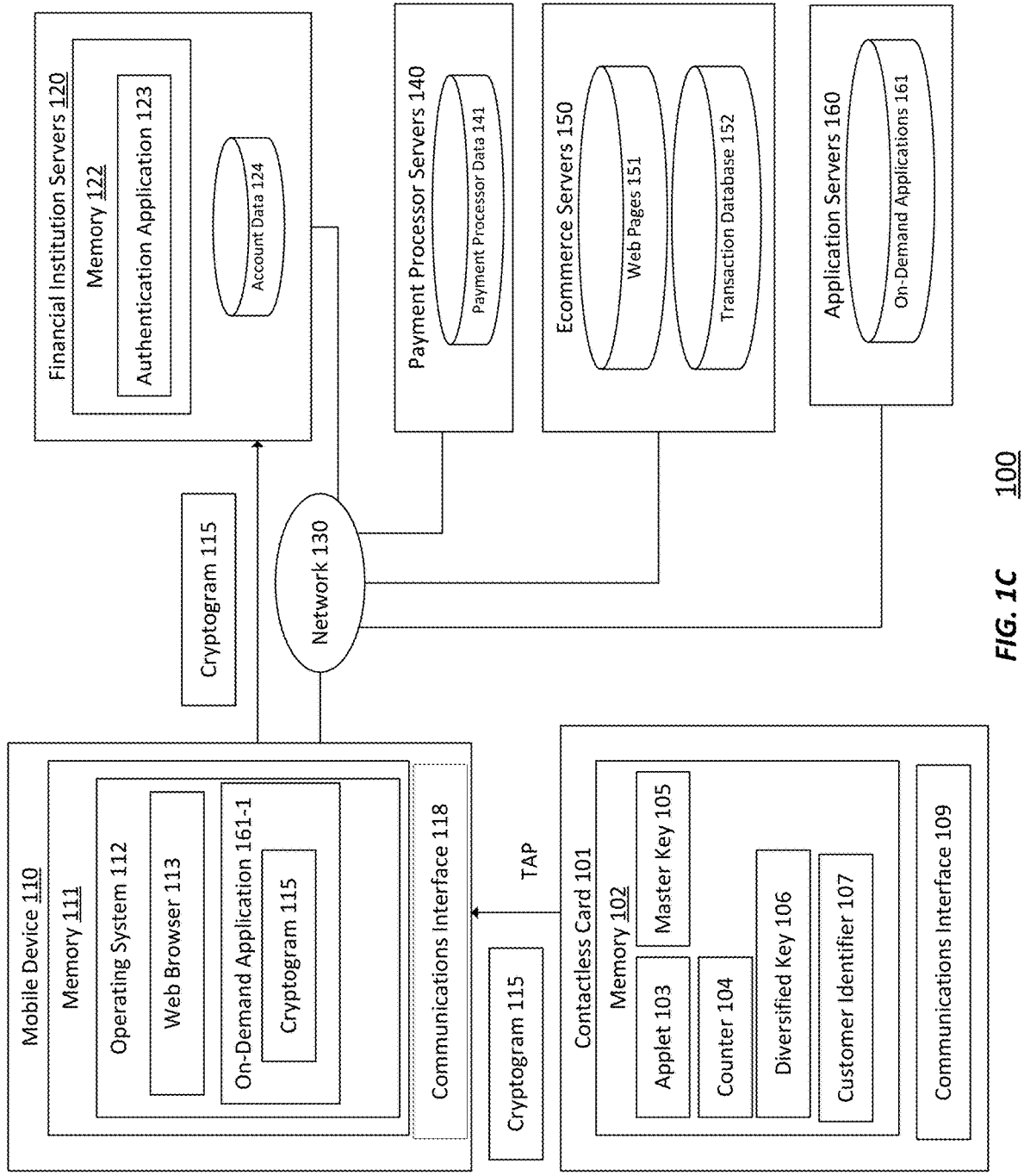

FIG. 1C depicts an embodiment where the OTP provided by the user matches the OTP generated by the authentication application 123 and the on-demand application 161-1. In response to determining the match and/or receiving an indication of the match from the authentication application 123, the on-demand application 161-1 instructs the user to tap the contactless card 101 to the device 110. The user may tap the contactless card 101 to the device 110 (or otherwise bring the contactless card 101 within communications range of the card reader 118 of the device 110). Generally, once the contactless card 101 is brought within communications range of the communications interface 118 of the device 110, the on-demand application 161-1 instructs the applet 103 of the contactless card 101 to generate a cryptogram 115. The cryptogram 115 may be based on the customer ID 107 of the contactless card 101. The cryptogram 115 may be generated based on any suitable cryptographic technique. In some embodiments, the applet 103 may include the cryptogram and an unencrypted customer ID 107 (and/or any other unique identifier) in a data package. In at least one embodiment, the data package including the cryptogram 115 and unencrypted customer ID 107 is an NDEF file.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120 associated with the financial institution issuing the contactless card 101. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125). The master key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the master key 105 and the data as input a cryptographic algorithm. For example, encrypting the customer ID 107 with the master key 105 may result in the cryptogram 115. Similarly, the server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the device 110). When preparing to send data (e.g., to the server 120 and/or the device 110), the applet 103 of the contactless card 101 may increment the counter value 104. The applet 103 of the contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the data (e.g., the customer ID 107 and/or any other data) using the diversified key 106 and the data as input to the cryptographic algorithm. For example, encrypting the customer ID 107 with the diversified key 106 may result in the encrypted customer ID (e.g., the cryptogram 115). As stated, the cryptogram 115 may be included in a data package, such as an NDEF file. The on-demand application 161-1 may then read the data package including the cryptogram 115 via the communications interface 118.

Regardless of the encryption technique used, the on-demand application 161-1 may then transmit the cryptogram 115 to the server 120 via the network 130. In some embodiments, the on-demand application 161-1 further provides the merchant identifier, transaction identifier, and any other element to the server 120. For example, the merchant identifier, transaction identifier, and other data elements specified in the URL 153 may be provided as input to the on-demand application 161-1.

The on-demand application 161-1 may further indicate, to the server 120, that the cryptogram 115 was read from the contactless card 101 via the card reader 118 of the device 110. Once received, the authentication application 123 may attempt to authenticate the cryptogram 115. For example, the authentication application 123 may attempt to decrypt the cryptogram 115 using a copy of the master key 105 stored by the server 120. In some embodiments, the authentication application 123 may identify the master key 105 and counter value 104 using the unencrypted customer ID 107 included in the data package. In some examples, the authentication application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the cryptogram 115.

Regardless of the decryption technique used, the authentication application 123 may successfully decrypt the cryptogram 115, thereby verifying or authenticating the cryptogram 115 (e.g., by comparing the customer ID 107 that is produced by decrypting the cryptogram to a known customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the cryptogram using the keys 105 and/or 106 and a cryptographic function. Similarly, the secure element and/or HSM 125 may generate the diversified key 106 based on the master key 105 and counter value 104 as described above. If the decryption is successful, the authentication application 123 may cause payment information to be generated and/or transmitted for the transaction. In some embodiments, the authentication application 123 may transmit a decryption result (also referred to as an "authentication result" or a "verification result") to the web browser 113 and/or the on-demand application 161-1 indicating whether the decryption was successful or unsuccessful.

If, however, the authentication application 123 is unable to decrypt the cryptogram 115 to yield the expected result (e.g., the customer ID 107 of the account associated with the contactless card 101), the authentication application 123 does not validate the cryptogram 115. In such an example, the authentication application 123 determines to refrain from generating payment information or otherwise providing payment information for the transaction. The authentication application 123 may transmit an indication of the failed decryption to the web browser 113 and/or the on-demand application 161-1. The web page 151-1 and/or the on-demand application 161-1 may then display an indication of the failed decryption, and therefore failed automatic payment, to the user.

Figure 1D:
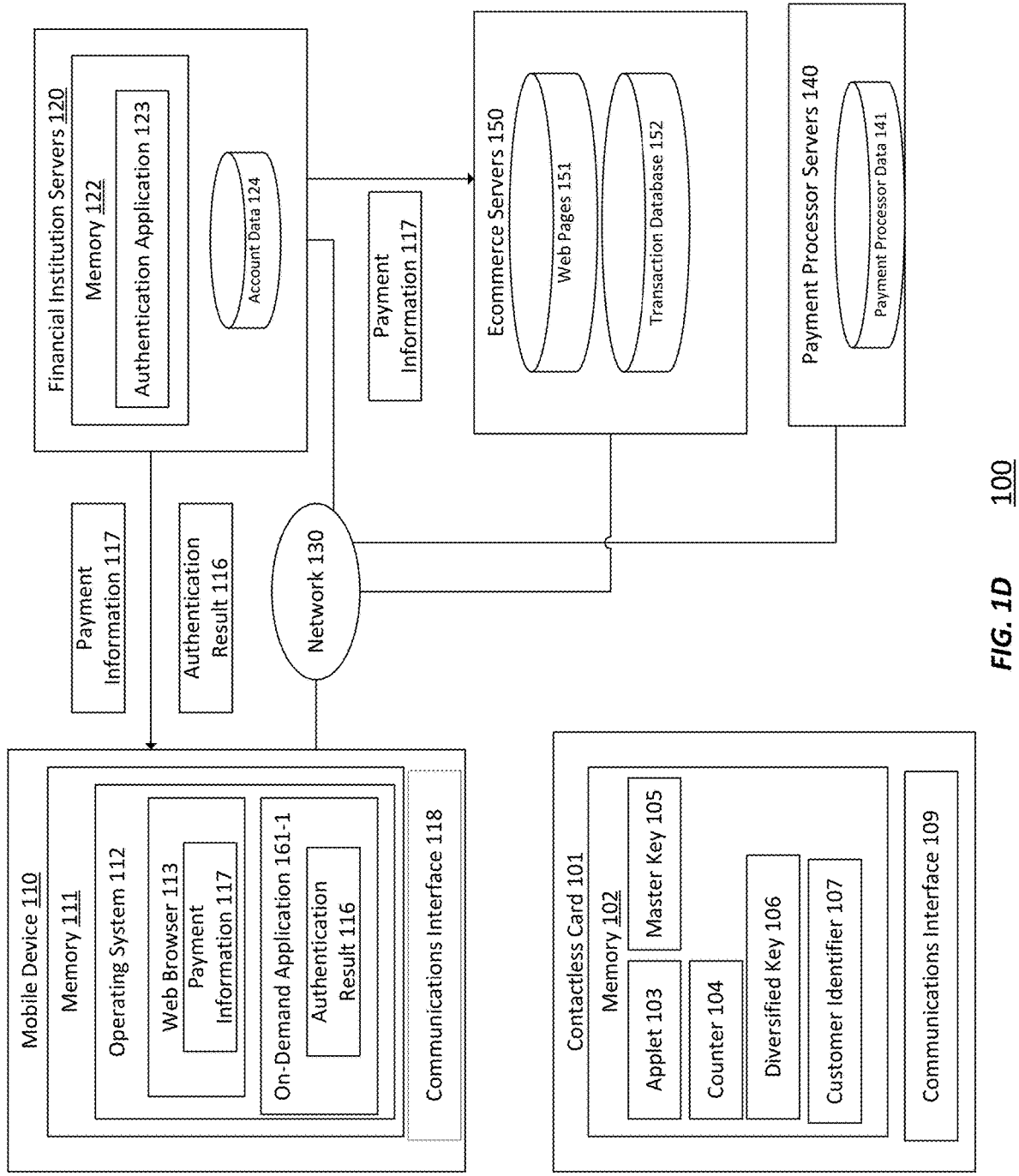

FIG. 1D illustrates an embodiment where the authentication application 123 successfully decrypted the cryptogram 115, thereby verifying (or authenticating) the cryptogram 115. In response, the authentication application 123 transmit a decryption result 116 that indicates that the authentication application 123 successfully decrypted the cryptogram 115 and that payment information 117 has been generated and/or transmitted for the requested purchase. The payment information 117 may include an account number (e.g., a primary account number (PAN)), expiration date, and CVV of the contactless card 101. In some embodiments, the payment information 117 further includes the user's name, billing address, and/or shipping address. In some embodiments, the account number is a one-time use virtual account number (VAN).

As shown, the server 120 may transmit the payment information 117 directly to the device 110, e.g., as a push notification, SMS message, etc. In such embodiments, the OS 112 may copy one or more elements of the information 117 to a clipboard (not pictured), where the clipboard may be used to paste the information 117 into one or more form fields in the web page 151-1. Additionally and/or alternatively, the OS 112 may provide the payment information 117 to an autofill service (not pictured) that automatically fills the payment information 117 in the form fields of the web page 151-1. The user may have the opportunity to review and approve the purchase using the received payment information 117. In some embodiments, however, the purchase is automatically processed in the web page 151-1 without requiring further user input. In some embodiments, described in greater detail elsewhere, the server 120 transmits the payment information 117 to the on-demand application 161-1, and the purchase is completed using the on-demand application 161-1.

Additionally and/or alternatively, as shown, the server 120 may transmit the payment information 117 to the ecommerce server 150. In such embodiments, the server 120 may transmit the merchant identifier and/or transaction identifier to the ecommerce server 150. Doing so allows the ecommerce server 150 to identify a session with the web browser 113. The ecommerce server 150 may then automatically fill the payment information 117 in to the one or more form fields in the web page 151-1 of the web browser 113. In some such embodiments, however, the payment information 117 is not transmitted to the device 110. Instead, the payment information 117 received from the server 120 is used to automatically process the transaction with the payment processor servers 140. If the payment information is sent to the device 110, the user may have the opportunity to review and approve the purchase using the received payment information 117 in the web browser 113. In some embodiments, however, the purchase is automatically processed in the web page 151-1 without requiring further user input.

Figure 1E:
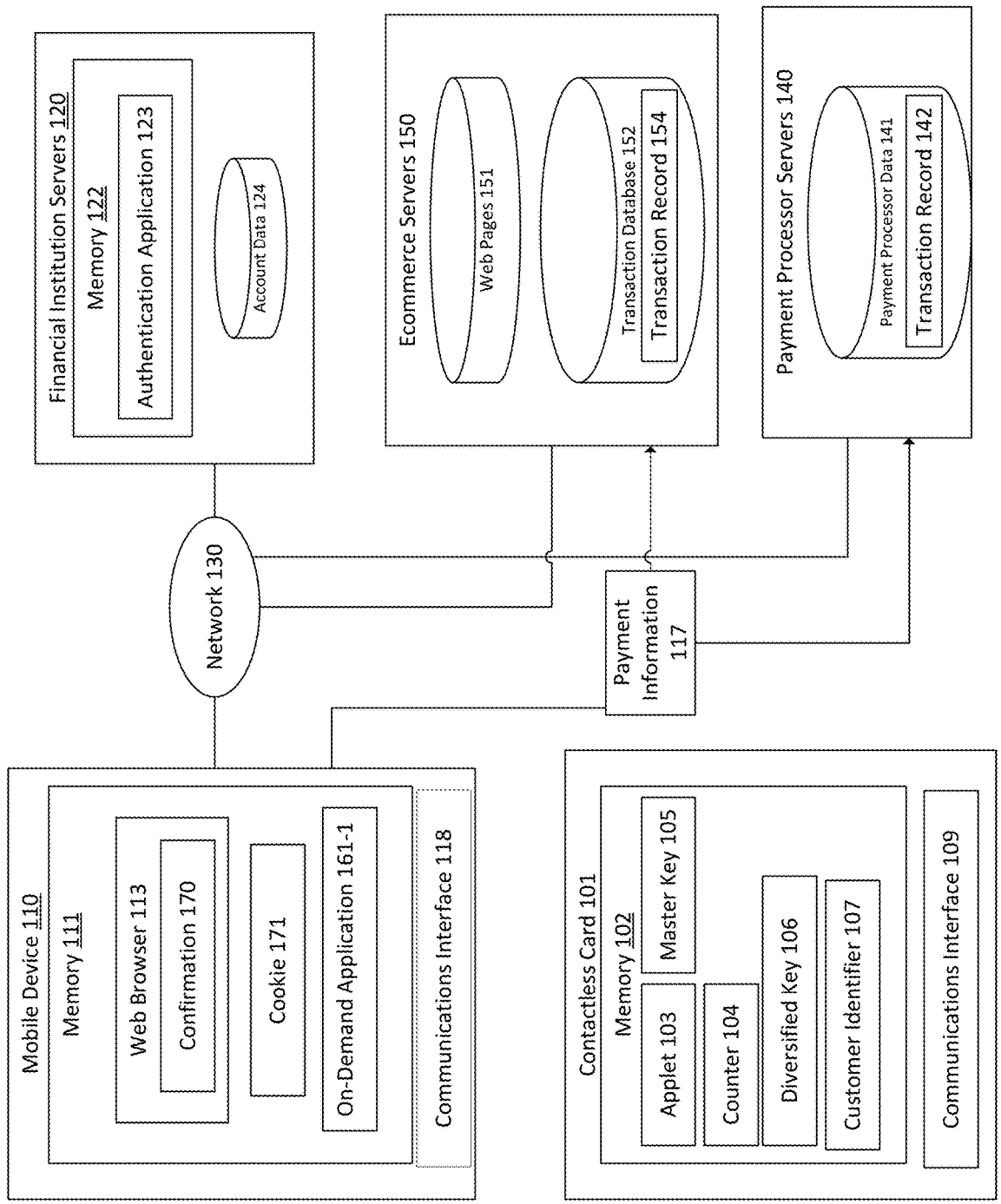

FIG. 1E depicts an embodiment where the purchase is processed using the payment information 117. As shown, the web browser 113 may transmit the payment information 117 (e.g., in an HTTP request) to the ecommerce server 150 and/or the payment processor server 140. In some embodiments, however, the web browser 113 transmits the payment information to the ecommerce server 150, and the web page 151-1 (or another component of the ecommerce server 150) provides the payment information 117 to the payment processor server 140. The ecommerce server 150 may then generate a transaction record 154 for the transaction in the transaction database 152. Similarly, the payment processor server 140 may generate a transaction record 142 in the payment processor data 141.

Once the payment for the transaction is processed, the ecommerce server 150 may transmit a confirmation 170 to the web browser 113. The confirmation 170 may be a portion of a web page 151. The confirmation 170 generally indicates that payment for the transaction was received and the transaction has been processed. Furthermore, as shown, the memory 111 of the device 110 includes a cookie 171. As stated, the cookie 171 may be stored by the on-demand application 161-1 subsequent to the OTP confirmation and/or by the web browser 113 based on the purchase confirmation 170. The cookie 171 may be used to authenticate the user for subsequent transactions without requiring the OTP verification and/or cryptogram verification. The cookie 171 may generally include a token or some other identifier, such as a combination of a token and an identifier of the device 110.

For example, if the user attempts to make a second purchase, the user may again select the URL 153 to use the on-demand application 161-1. The on-demand application 161-1 may be downloaded (if not available on the device) and executed. The on-demand application 161-1 may identify the cookie 171 stored on the device. In response, the on-demand application 161-1 determines to forego the OTP generation and/or verification. The on-demand application on-demand application 161-1 may identify the first financial institution based on the cookie 171 and instruct the server 120 associated with the first financial institution to generate a second VAN, an expiration date for the second VAN, and a CVV for the second VAN. Advantageously, based on the identification of the cookie, the user is not required to tap the card to the device to facilitate decryption of another cryptogram by the server. The second VAN, expiration date, and CVV may then be used to complete the second purchase as described herein.

Advantageously, the purchase is securely processed using a web browser 113 and the web pages 151 without requiring the device 110 to execute a dedicated client application provided by an entity associated with the contactless card 101 (e.g., the application 114 provided by the financial institution associated with the contactless card 101). Further still, each web page 151 does not need to include functionality for reading data from different cards and/or communicating with different servers 120. Further still, the security of the card 101 and/or associated account is enhanced by using the cryptogram generated by the contactless card 101 as a condition to the purchase.

Figure 2B:
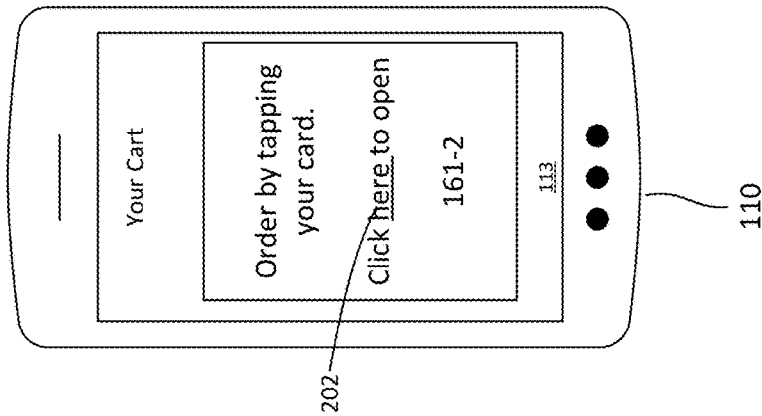
Figure 2A:
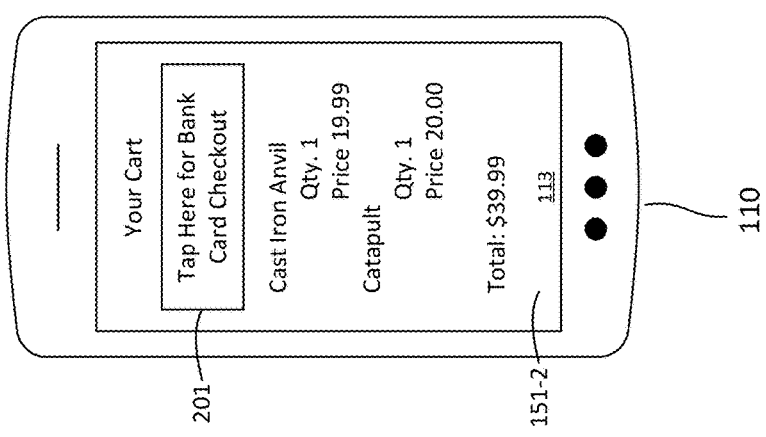

FIG. 2A is a schematic 200 depicting an example computing device 110, consistent with disclosed embodiments. More specifically, FIG. 2A depicts an embodiment where the web browser 113 displays a checkout web page 151-2. As shown, the web page 151-2 includes a selectable element 201 to initiate payment using a contactless card 101. The selectable element 201 may correspond to a URL, such as the URL 153, directed to one of the on-demand applications 161. The URL may include a merchant identifier, transaction (or cart) identifier, and any other relevant parameters. Once selected, the device 110 may download the on-demand application 161 at the URL.

FIG. 2B is a schematic 210 illustrating an embodiment where an on-demand application 161-2 is downloaded and executed on the device 110. As shown, the on-demand application 161-2 provides a welcome page and a URL 202 to initiate payment using the contactless card 101. FIGS. 2A-2E reflect embodiments where the user has previously completed the OTP verification process and a cookie 171 has been stored on the device based on the OTP verification. Therefore, the on-demand application 161-2 may identify and validate a cookie 171 on the device 110 and determine to forego requesting the user's email to initiate the OTP flow.

FIG. 2C is a schematic 220 reflecting an embodiment where the user selects the URL 202. As shown, the on-demand application 161-2 instructs the user to tap the contactless the contactless card 101 to the computing device 110 to process payment. When the card 101 comes within communications range of the card reader 118, the on-demand application 161-2 controls the card reader 118 to instruct the applet 103 of the contactless card 101 to generate a diversified key 106 as described above, and use the generated diversified key 106 to generate a cryptogram (e.g., an encrypted customer ID 107). The applet 103 may further generate an NDEF file or other data package that includes the cryptogram and an unencrypted identifier, e.g., an unencrypted customer ID 107, the merchant ID, the transaction ID, and the like. In such embodiments, the on-demand application 161-2 may provide the merchant ID and/or transaction ID to the applet 103.

The on-demand application 161-2 may then read the data package or NDEF file, e.g., via NFC. Once read, the on-demand application 161-2 may transmit the data package to the server 120 for processing. The on-demand application 161-2 may select the server 120 based on the cookie 171. The on-demand application 161-2 may optionally process the data package, e.g., to format the data package, add the merchant ID, add the transaction ID, etc. The on-demand application 161-2 may further indicate, to the server 120, that the cryptogram was read from the contactless card 101 via the card reader 118 of the device 110.

Once received, the authentication application 123 may attempt to verify the cryptogram in the data package. In at least one embodiment, the unencrypted customer ID 107 provided by the applet 103 may be used by authentication application 123 to identify the relevant account, counter value 104, and/or master key 105 in the account data 124. The authentication application 123 may attempt to decrypt the cryptogram by providing the master key 105 and incremented counter value 104 as input to the cryptographic algorithm, which produces the diversified key 106 as output. The resulting diversified key 106 may correspond to the instance of the diversified key 106 generated by the contactless card 101 to create the cryptogram, which may be used to decrypt the cryptogram. Generally, the authentication application 123 may transmit a decryption result to the web browser 113 and/or the on-demand application 161-2 indicating whether the decryption was successful or unsuccessful. If the decryption is successful, the authentication application 123 may generate a virtual account number (VAN), expiration date for the VAN, and a CVV for the VAN. The authentication application 123 may then transmit the generated data to the device 110 and/or any suitable component thereof.

FIG. 2D is a schematic 230 illustrating an embodiment where the server 120 decrypted the cryptogram generated by the contactless card 101 and read by the on-demand application 161-2. As shown, the on-demand application 161-2 may output an approval page based on the decryption result received from the server 120 responsive to decrypting the cryptogram. The on-demand application 161-2 may then include a selectable element 205 for requesting the user's approval to share or otherwise use the payment information for the transaction. Once selected, the on-demand application 161-2 may process the purchase using the payment information received from the server 120. For example, the on-demand application 161-2 may transmit the merchant identifier, transaction identifier, account holder name, the VCN, the expiration date, the CVV, the billing address, and/or the shipping address to the ecommerce server 150 and/or the payment processor server 140 for processing. However, in some embodiments, the server 120 provides the payment information generated by the server 120 to the web browser 113 as described in greater detail herein responsive to the selection of selectable element 205. Doing so may cause the web browser 113 to submit the payment information to the ecommerce server 150 and/or the payment processor server 140 for processing.

Figure 2E:
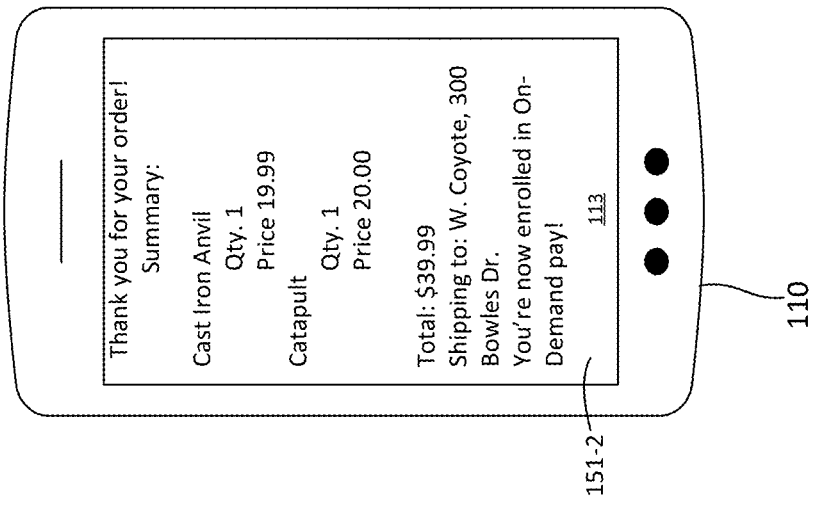

FIG. 2E is a schematic 240 depicting an embodiment where the web browser 113 outputs a confirmation in web page 151-2. The confirmation page may be displayed based on a confirmation 170 received from the ecommerce server 150. The confirmation may generally include details regarding the processed transaction.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 3A:
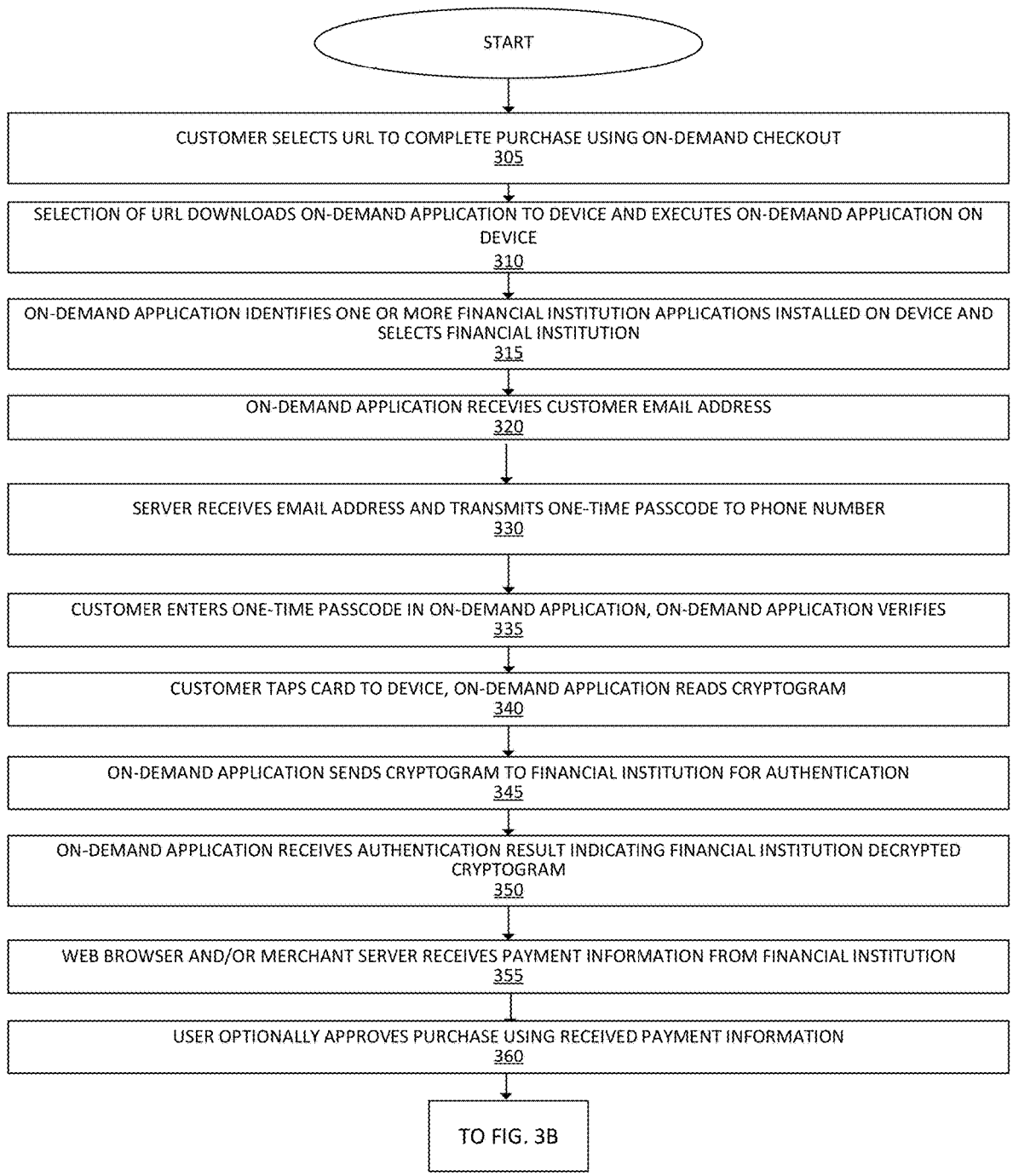
FIGS. 3A-3B illustrate a first logic flow.
Figure 3B:
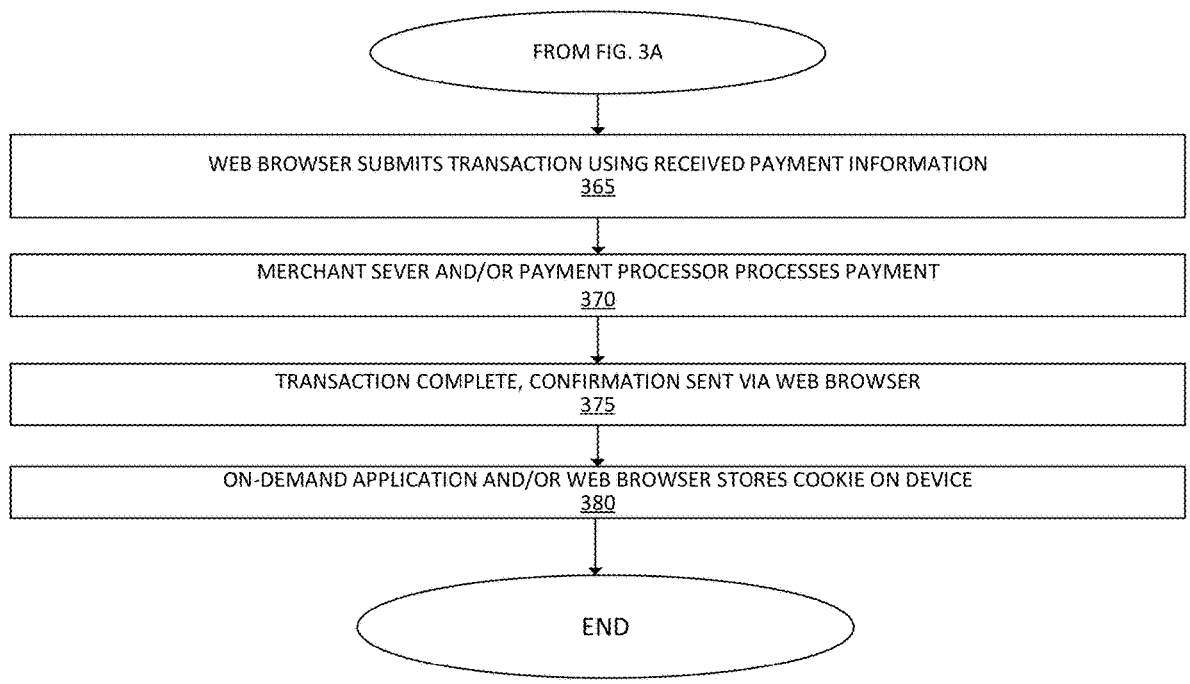

FIGS. 3A-3B illustrate an embodiment of a logic flow 300. The logic flow 300 may be representative of some or all of the operations executed by one or more embodiments described herein. For example, the logic flow 300 may include some or all of the operations to extend a transaction initiated in a web browser 113 using an on-demand application 161. Embodiments are not limited in this context.

At block 305, a web page 151 rendered in a browser 113 of a device 110 may include a URL, such as the URL 153, that is directed to an on-demand application 161. The user may select the URL 153 to complete a purchase using the linked on-demand application 161. The URL 153 may further include parameters describing one or more attributes of the transaction, such as a merchant identifier, a transaction identifier, and the like. At block 310, the selection of the URL causes the device 110 to download and execute the on-demand application 161. At block 315, the on-demand application 161 may scan the device 110 to identify any applications 114 on the device that are registered to one or more financial institutions. The on-demand application 161 may select one of the identified applications 114, e.g., based on one or more attributes of each application 114 and/or a score computed for each application by the on-demand application 161 based on the attributes. The attributes may include, but are not limited to, the most recent use of the application 114, the most frequently used application 114, the number of times the application 114 has been used within a predetermined time period, a size of the financial institution, a number of customers of the financial institution, etc. The selected application 114 may be associated with at least one financial institution server 120. If no applications 114 are identified, the on-demand application 161 may select one or more financial institution servers 120 based on a list of financial institution servers stored by the on-demand application 161.

At block 320, the on-demand application 161 requests an email address from the user and receives input comprising an email address. The on-demand application 161 may transmit the email address to the financial institution server 120 identified at block 315. At block 330, the authentication application 123 of the selected financial institution server 120 receives the email address from the on-demand application 161. The authentication application 123 may query the account data 124 using the email address to receive a phone number of an account associated with the email address. The authentication application 123 may then generate an OTP and transmit the OTP to the phone number, e.g., via an SMS message.

At block 335, the user provides the received OTP as input to the on-demand application 161. The on-demand application 161 may verify the OTP entered by the user. For example, the on-demand application 161 may receive the OTP generated by the authentication application 123 and compare the received OTP to the input provided by the user. In such an example, on-demand application 161 may transmit a result of the comparison to the authentication application 123. As another example, the on-demand application 161 may transmit the input received from the user to the authentication application 123. The authentication application 123 may then compare the received input to the generated OTP and transmit a comparison result to the on-demand application 161. Regardless of the entity performing the comparison, if the comparison results in a match, the email address may be verified and the account of the user in the account data 124 may be updated to reflect enrollment for purchases using the web browser 113 and an on-demand application 161.

At block 340, the on-demand application 161 instructs the user to tap their contactless card 101 to the device 110. When the user taps the card 101 to the device 110, the on-demand application 161 instructs the applet 103 to generate a cryptogram. In some embodiments, the on-demand application 161 provides the merchant ID and/or transaction ID to the applet 103, which may include the merchant ID and/or transaction ID in a data package (e.g., an NDEF file) comprising the cryptogram. The on-demand application 161 may then read the cryptogram, which may be included in the NDEF file. At block 345, the on-demand application 161 sends the cryptogram to the financial institution server 120 associated with the contactless card 101. At block 350, the on-demand application 161 receives a decryption result indicating the authentication application 123 decrypted the cryptogram, thereby authenticating and/or verifying the cryptogram. Based on the decryption, the authentication application 123 may generate a VCN, expiration date, and CVV for the account associated with the contactless card 101.

At block 355, the web browser 113 may receive payment information 117 generated by the authentication application 123 based on the verification of the OTP at block 335 and the decryption of the cryptogram at block 350. For example, the authentication application 123 may provide the payment information 117 to the ecommerce server 150 hosting the web page 151, and a web server of the ecommerce server 150 may provide the payment information 117 to the web browser 113. At block 360, the user may optionally approve the purchase using the payment information 117. In some embodiments, however, user approval is not required, and the purchase is automatically completed using the received payment information 117.

Continuing to FIG. 3B, at block 365, the web browser 113 may submit the at least the payment information 117 to the ecommerce server 150 and/or the payment processor server 140 to process the transaction. At block 370, the ecommerce server 150 and/or the payment processor server 140 processes the transaction using the payment information 117 generated by the server. At block 375, the transaction complete and a confirmation is sent to the web browser 113. At block 380, the on-demand application 161 and/or the web browser 113 stores a cookie 171 on the device 110. The cookie 171 may include a token or other information to allow the on-demand application 161 to determine that the user has completed the OTP registration. The token may further be used to identify the financial institution and/or financial institution server 120 associated with the card 101. As stated, in some embodiments, the cookie 171 may be stored subsequent to the verification of the OTP at block 335.

Figure 4:
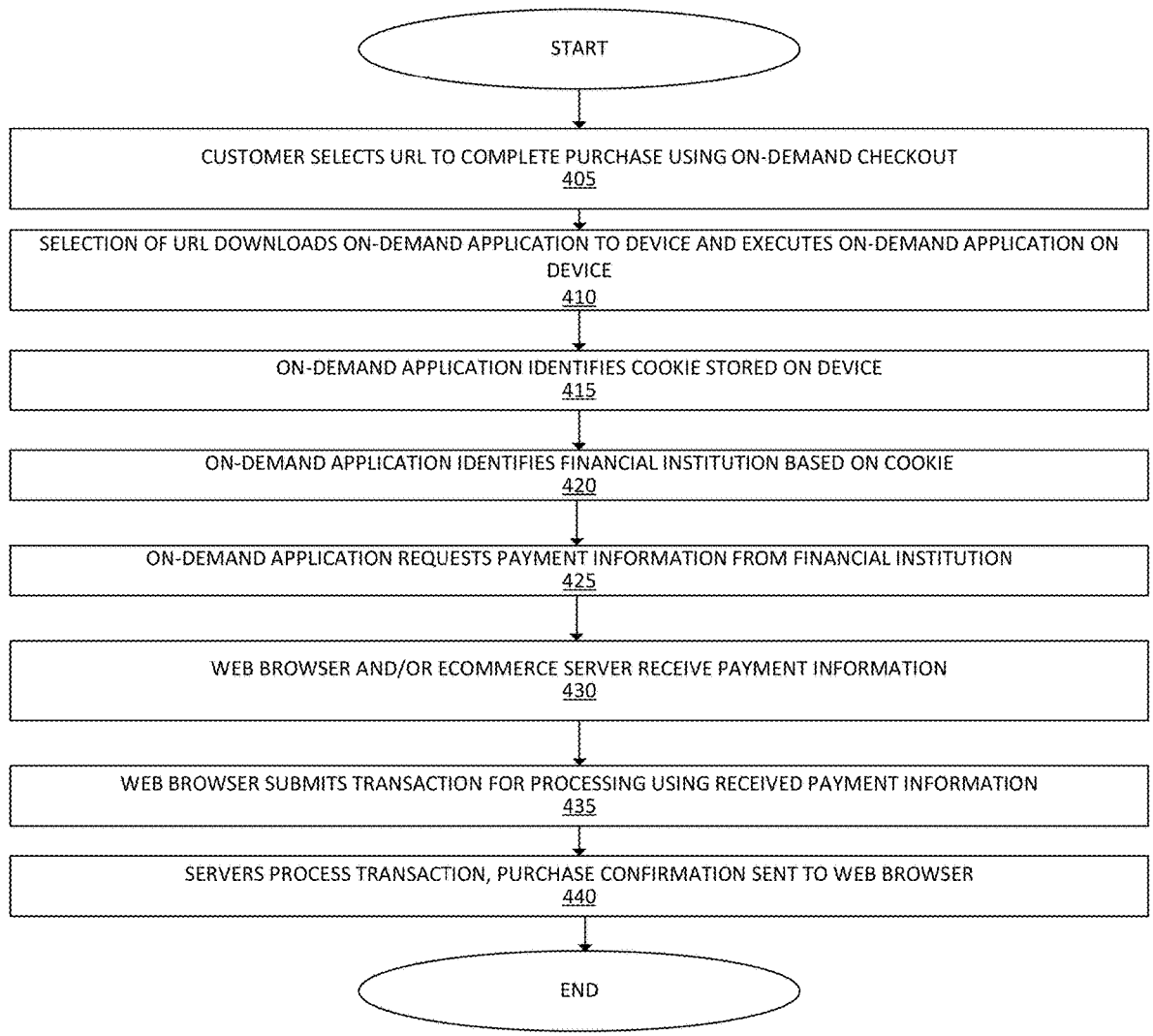
FIG. 4 illustrates a second logic flow.

FIG. 4 illustrates an embodiment of a logic flow 400. The logic flow 400 may be representative of some or all of the operations executed by one or more embodiments described herein. For example, the logic flow 400 may include some or all of the operations to extend a transaction initiated in a web browser 113 using an on-demand application 161. Embodiments are not limited in this context.

At block 405, a web page 151 rendered in a browser 113 of a device 110 may include a URL, such as the URL 153, that is directed to an on-demand application 161. The user may select the URL 153 to complete a purchase using the linked on-demand application 161. The URL 153 may further include parameters describing one or more attributes of the transaction, such as a merchant identifier, a transaction identifier, and the like. At block 410, the selection of the URL causes the device 110 to download and execute the on-demand application 161. At block 415, the on-demand application 161 identifies a cookie 171 stored in the memory of the device 110. Doing so allows the on-demand application 161 to forego the OTP verification flow. At block 420, the on-demand application 161 identifies the financial institution and/or financial institution server 120 associated with the card 101.

At block 425, the on-demand application 161 requests payment information from the financial institution server 120 identified at block 420. The server 120 may then generate payment information 117 comprising a VCN, expiration date, and CVV. In some embodiments, the generation of the payment information 117 is conditioned on the contactless card 101 generating another cryptogram, and the server 120 verifying the cryptogram. At block 430, the web browser 113 and/or the ecommerce server 150 receives the payment information 117 generated at block 425. At block 435, the web browser 113 submits the payment information 117 to the ecommerce server 150 and/or the payment processor server 140 to process the transaction. At block 440, the ecommerce server 150 and/or the payment processor server 140 process the transaction. Doing so may include storing one or more transaction records for the transaction and transmitting a confirmation for the purchase to the web browser 113.

Figure 5A:
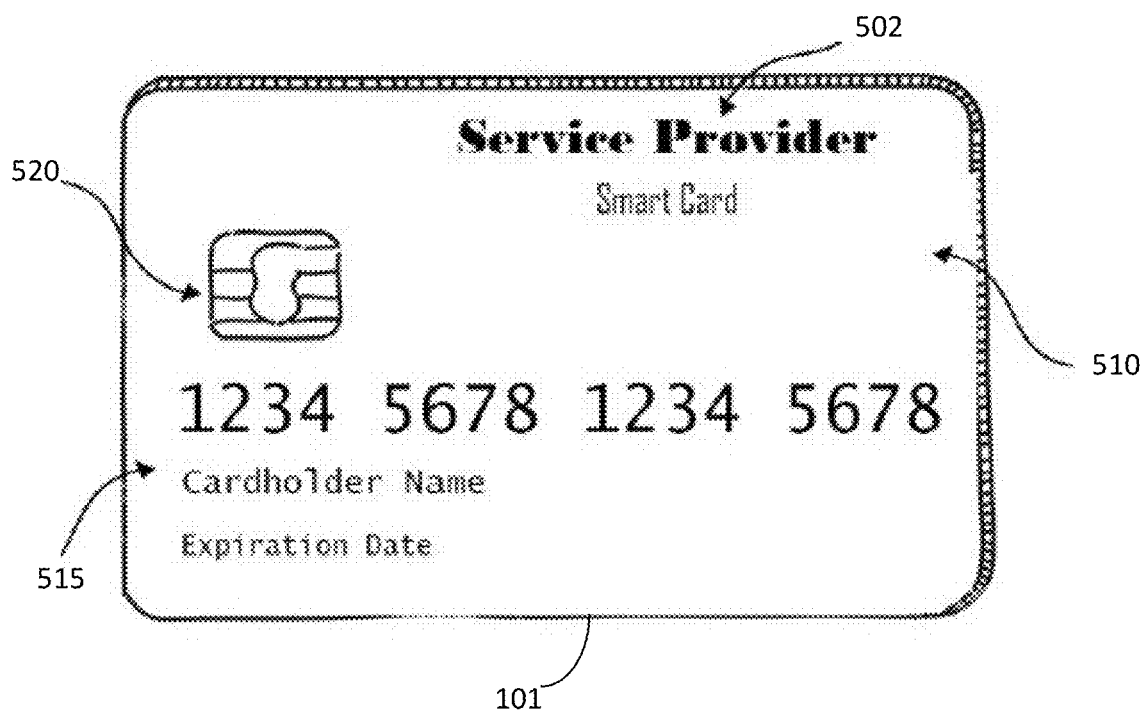
FIGS. 5A-5B illustrate an example contactless card.

FIG. 5A is a schematic 500 illustrating an example configuration of a contactless card 101, which may include a payment card, such as a credit card, debit card, or gift card, issued by a service provider as displayed as service provider indicia 502 on the front or back of the contactless card 101.

In some examples, the contactless card 101 is not related to a payment card, and may include, without limitation, an identification card. In some examples, the contactless card may include a dual interface contactless payment card, a rewards card, and so forth. The contactless card 101 may include a substrate 510, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

Figure 5B:
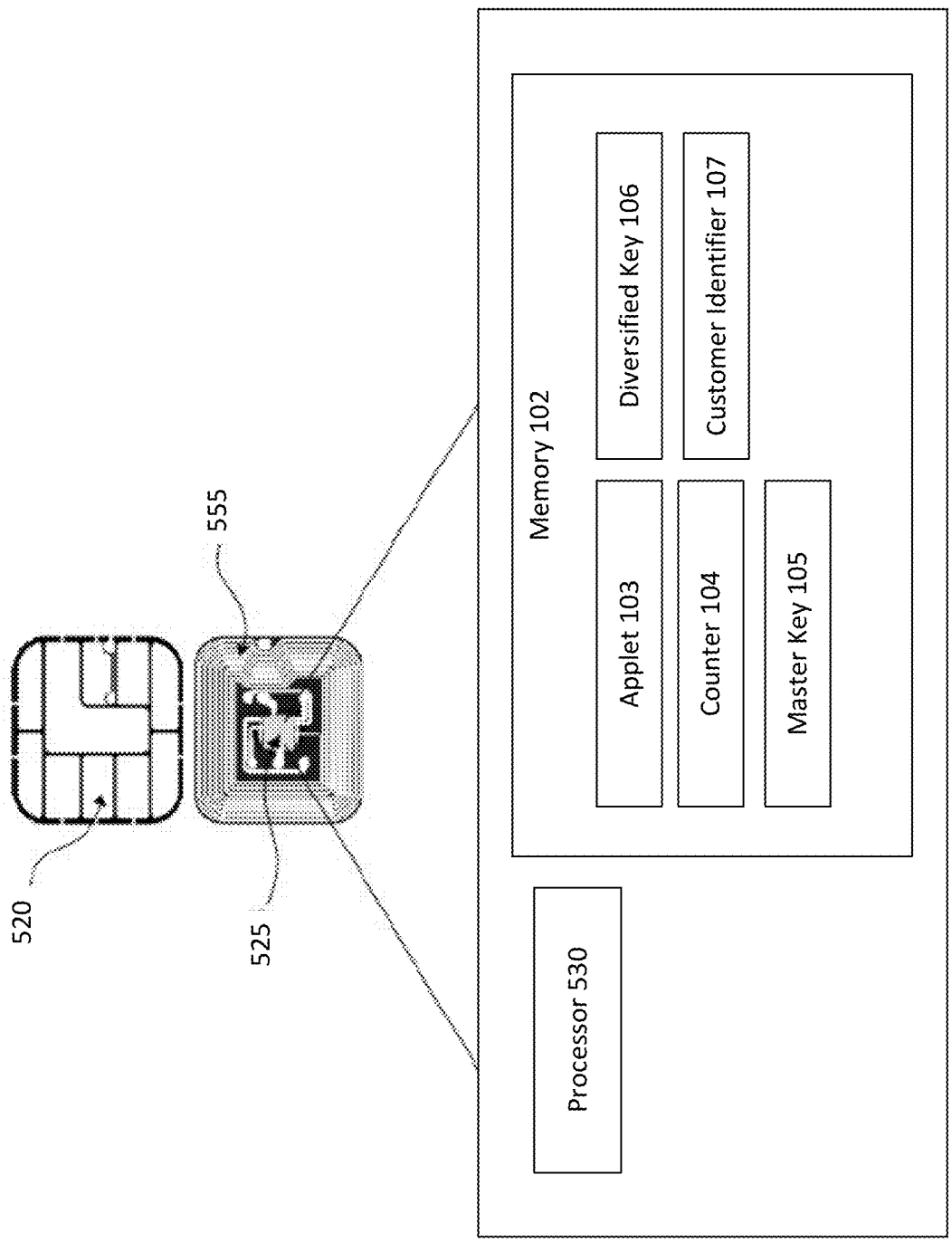

The contactless card 101 may also include identification information 515 displayed on the front and/or back of the card, and a contact pad 520. The contact pad 520 may include one or more pads and be configured to establish contact with another client device, such as an ATM, a user device, smartphone, laptop, desktop, or tablet computer via contactless cards. The contact pad may be designed in accordance with one or more standards, such as ISO/IEC 7816 standard, and enable communication in accordance with the EMV protocol. The contactless card 101 may also include processing circuitry, antenna and other components as will be further discussed in FIG. 5B. These components may be located behind the contact pad 520 or elsewhere on the substrate 510, e.g. within a different layer of the substrate 510, and may electrically and physically coupled with the contact pad 520. The contactless card 101 may also include a magnetic strip or tape, which may be located on the back of the card (not shown in FIG. 5A). The contactless card 101 may also include a Near-Field Communication (NFC) device coupled with an antenna capable of communicating via the NFC protocol. Embodiments are not limited in this manner.

As illustrated, the contact pad 520 of contactless card 101 may include processing circuitry 525 for storing, processing, and communicating information, including a processor 530, a memory 102, and one or more communications interface 109. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 102 may be encrypted memory utilizing an encryption algorithm executed by the processor 530 to encrypt data.

The memory 102 may be configured to store one or more applets 103, one or more counters 104, the master key 105, a diversified key 106, and a customer ID 107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The one or more counters 104 may comprise a numeric counter sufficient to store an integer. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card 101 associated with the customer's account.

The processor 530 and memory elements of the foregoing exemplary embodiments are described with reference to the contact pad 520, but the present disclosure is not limited thereto. It is understood that these elements may be implemented outside of the contact pad 520 or entirely separate from it, or as further elements in addition to processor 530 and memory 102 elements located within the contact pad 520.

In some examples, the contactless card 101 may comprise one or more antenna(s) 555. The one or more antenna(s) 555 may be placed within the contactless card 101 and around the processing circuitry 525 of the contact pad 520. For example, the one or more antenna(s) 555 may be integral with the processing circuitry 525 and the one or more antenna(s) 555 may be used with an external booster coil. As another example, the one or more antenna(s) 555 may be external to the contact pad 520 and the processing circuitry 525.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the power connection of the contactless card 101, which may be functionally maintained through one or more capacitors. The contactless card 101 may communicate back by switching a load on the coil or load modulation. Load modulation may be detected in the terminal's coil through interference. More generally, using the antenna(s) 555, processor 530, and/or the memory 102, the contactless card 101 provides a communications interface to communicate via NFC, Bluetooth, and/or Wi-Fi communications.

As explained above, contactless card 101 may be built on a software platform operable on smart cards or other devices having limited memory, such as JavaCard, and one or more or more applications or applets may be securely executed. Applet 103 may be added to contactless cards to provide a one-time password (OTP) for multifactor authentication (MFA) in various mobile application-based use cases. Applet 103 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applets 103 may be configured to encode the OTP as an NDEF type 4 well known type text tag. In some examples, NDEF messages may comprise one or more records, such as a cryptogram and an unencrypted customer ID 107 (or other unencrypted unique identifier for the card 101 and/or the associated account). The applets 103 may be configured to add one or more static tag records in addition to the OTP record.

In some examples, the one or more applets 103 may be configured to emulate an RFID tag. The RFID tag may include one or more polymorphic tags. In some examples, each time the tag is read, different cryptographic data is presented that may indicate the authenticity of the contactless card 101. Based on the one or more applet 103, an NFC read of the tag may be processed, the data may be transmitted to a server, such as a server 120 of a banking system, and the data may be validated at the server.

In some examples, the contactless card 101 and server 120 may include certain data such that the card may be properly identified. The contactless card 101 may include one or more unique identifiers (not pictured). Each time a read operation takes place, the counter 104 may be configured to increment. In some examples, each time data from the contactless card 101 is read (e.g., by a computing device 110), the counter 104 is transmitted to the server for validation and determines whether the counter 104 are equal (as part of the validation) to a counter 104 of the server.

The one or more counter 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In some examples, the counter that is incremented on the card is different from the counter that is incremented for transactions. The contactless card 101 is unable to determine the application transaction counter 104 since there is no communication between applet 103 on the contactless card 101. In some examples, the contactless card 101 may comprise a first applet 103-1, which may be a transaction applet, and a second applet 103-2, which may be an authentication applet for authenticating calls as disclosed herein. Each applet 103-1 and 103-2 may comprise a respective counter 104.

In some examples, the counter 104 may get out of sync. In some examples, to account for accidental reads that initiate transactions, such as reading at an angle, the counter 104 may increment but the application does not process the counter 104. In some examples, when the device 110 is woken up, NFC may be enabled and the device 110 may be configured to read available tags, but no action is taken responsive to the reads.

To keep the counter 104 in sync, an application, such as a background application, may be executed that would be configured to detect when the device 110 wakes up and synchronize with the server of a banking system (e.g., a server 120) indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 5DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 3.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 6:
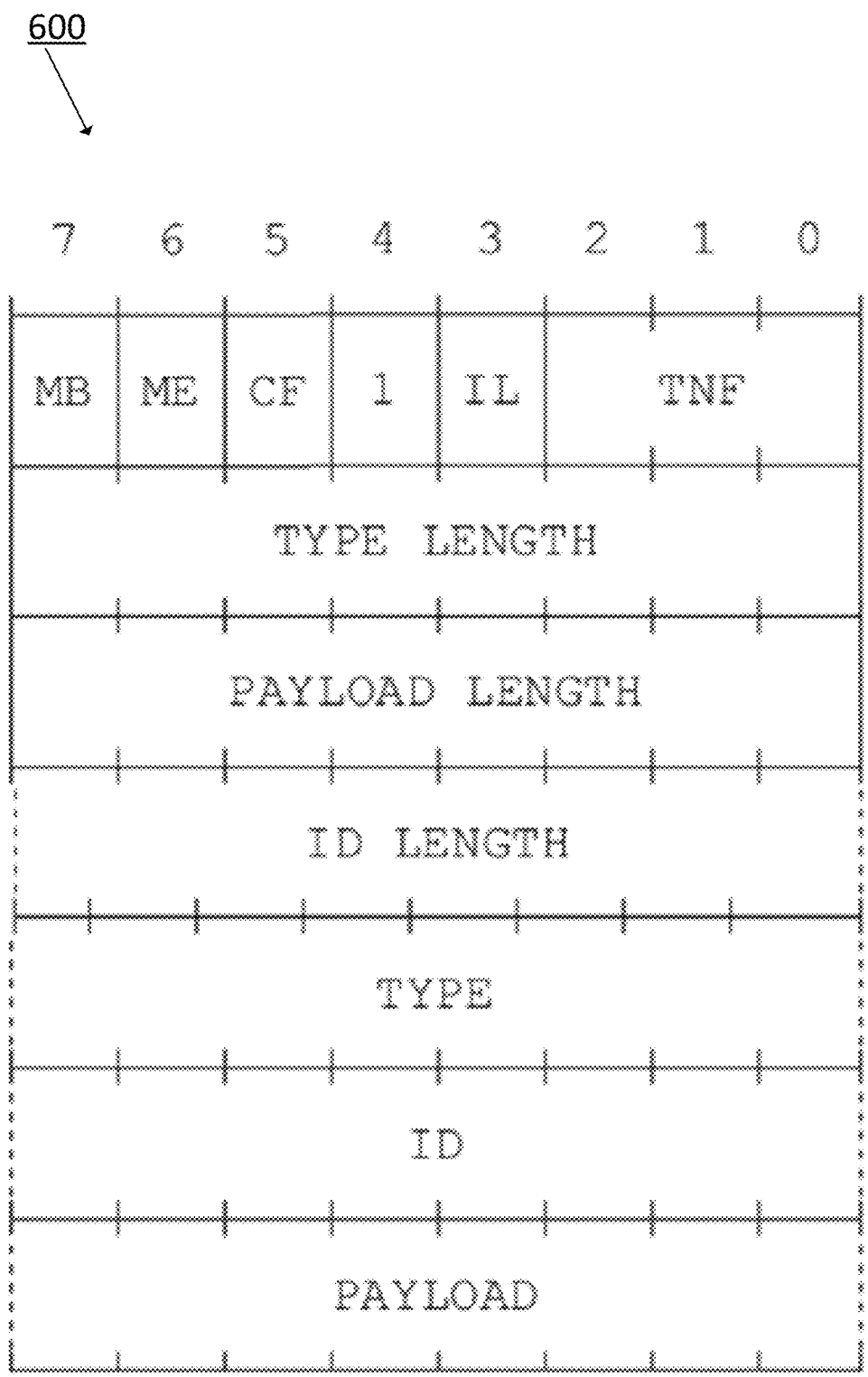
FIG. 6 illustrates a data structure.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850104; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. In various embodiments, the payload of the data structure 600 may store a cryptogram (e.g., an encrypted customer ID 107) and any other relevant data, such as an unencrypted customer ID 107, and/or some other unencrypted value that uniquely identifies a card 101 and/or an account associated with the card 101.

Figure 7:
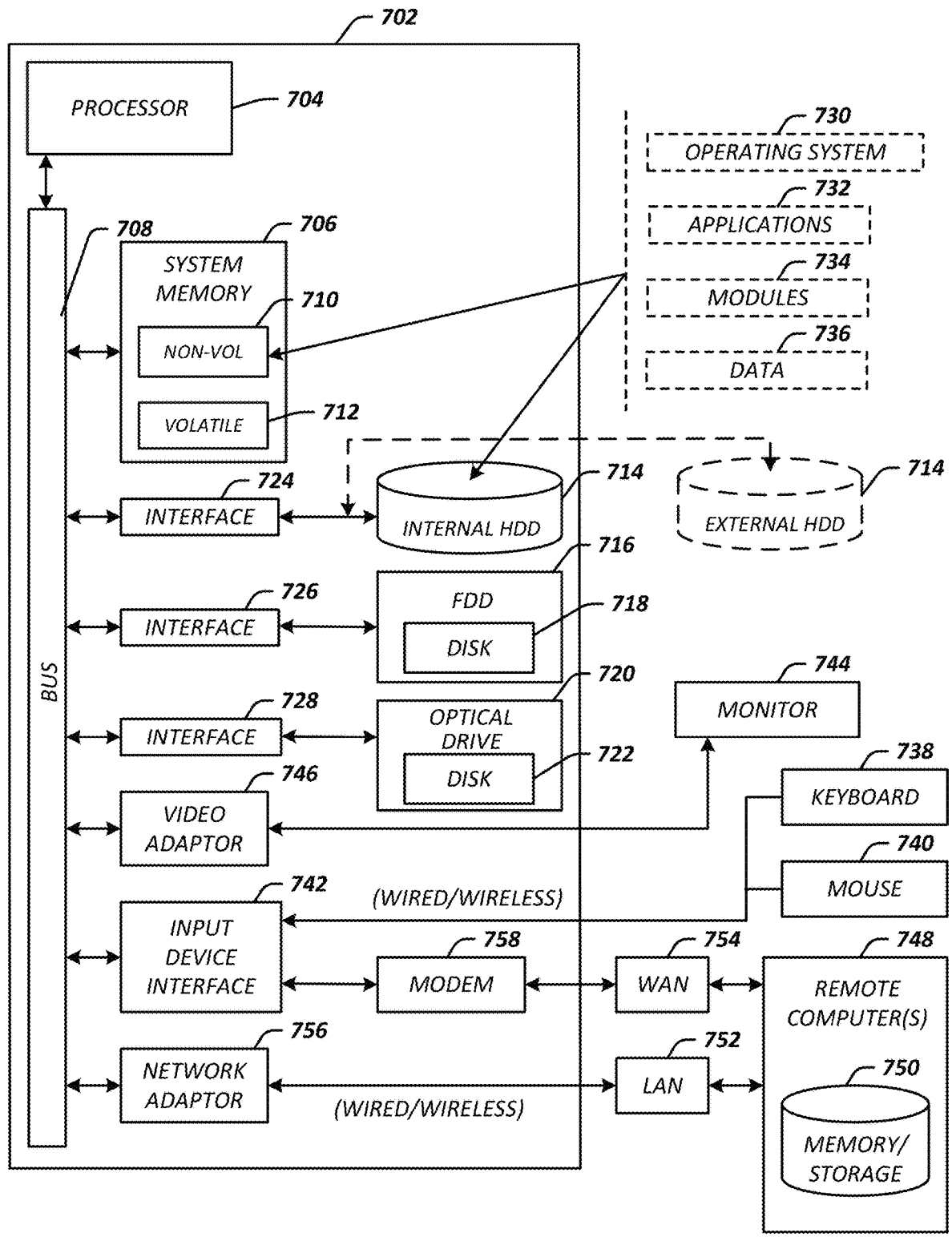
FIG. 7 illustrates a computer architecture.

FIG. 7 illustrates an embodiment of an exemplary computer architecture 700 comprising a computing system 702 that may be suitable for implementing various embodiments as previously described. In one embodiment, the computer architecture 700 may include or be implemented as part of computing system 100. In some embodiments, computing system 702 may be representative, for example, of the contactless card 101, computing devices 110, and servers 120, 140, 150, and 160 of the system 100. The embodiments are not limited in this context. More generally, the computing architecture 700 is configured to implement all logic, applications, systems, methods, apparatuses, and functionality described herein with reference to FIGS. 1A-6.

As used in this application, the terms "system" and "component" are intended to refer to a computer-related entity, either hardware, a combination of hardware and software, software, or software in execution, examples of which are provided by the exemplary computing computer architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processor 704, a system memory 706 and a system bus 708. The processor 704 can be any of various commercially available processors.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile 710 and/or volatile 712 memory. A basic input/output system (BIOS) can be stored in the non-volatile memory 710.

The computer 702 may include various types of computer-readable storage media in the form of one or more lower speed memory units, including an internal (or external) hard disk drive 730, a magnetic disk drive 716 to read from or write to a removable magnetic disk 720, and an optical disk drive 728 to read from or write to a removable optical disk 732 (e.g., a CD-ROM or DVD). The hard disk drive 730, magnetic disk drive 716 and optical disk drive 728 can be connected to system bus 708 the by an HDD interface 714, and FDD interface 718 and an optical disk drive interface 734, respectively. The HDD interface 714 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile memory 710, and volatile memory 712, including an operating system 722, one or more applications 742, other program modules 724, and program data 726. In one embodiment, the one or more applications 742, other program modules 724, and program data 726 can include, for example, the various applications and/or components of the system 100, such as the applet 103, counter 104, master key 105, diversified key 106, customer ID 107, URLs 108, web browser 113, financial institution servers 120, authentication application 123, account data 124, payment processor servers 140, payment processor data 141, ecommerce servers 150, web pages 151, transaction database 152, application servers 160, and on-demand applications 161.

A user can enter commands and information into the computer 702 through one or more wire/wireless input devices, for example, a keyboard 750 and a pointing device, such as a mouse 752. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 736 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adapter 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory and/or storage device 758 is illustrated. The logical connections depicted include wire/wireless connectivity to a local area network 756 and/or larger networks, for example, a wide area network 754. Such LAN and WAN networking environments are commonplace in offices and companies, and facilitate enterprise-wide computer networks, such as intranets, all of which may connect to a global communications network, for example, the Internet.

When used in a local area network 756 networking environment, the computer 702 is connected to the local area network 756 through a wire and/or wireless communication network interface or network adapter 738. The network adapter 738 can facilitate wire and/or wireless communications to the local area network 756, which may also include a wireless access point disposed thereon for communicating with the wireless functionality of the network adapter 738.

When used in a wide area network 754 networking environment, the computer 702 can include a modem 740, or is connected to a communications server on the wide area network 754 or has other means for establishing communications over the wide area network 754, such as by way of the Internet. The modem 740, which can be internal or external and a wire and/or wireless device, connects to the system bus 708 via the input device interface 736. In a networked environment, program modules depicted relative to the computer 702, or portions thereof, can be stored in the remote memory and/or storage device 758. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving, by a processor of a device from an ecommerce server, a web page including a uniform resource locator (URL), the URL directed to an on-demand application hosted by an application server and the URL including one or more of a merchant identifier associated with the web page and a cart identifier for a transaction;
downloading, by the processor of the device based on a selection of the URL in a web browser of the device, the on-demand application from the application server;
selecting, by the on-demand application, a first financial institution based on a plurality of financial institution applications installed on the device;
generating, by a contactless card associated with an account of the first financial institution, encrypted data including a cryptogram by encrypting a customer identifier using a master key of the contactless card;
receiving, by the on-demand application through a communication interface of the device, the encrypted data from the contactless card;
transmitting, by the on-demand application, the encrypted data to an authentication server of the first financial institution;
receiving, by the on-demand application from the authentication server, an authentication result specifying the authentication server decrypted the encrypted data;
receiving, by the web browser of the device based on the decryption of the encrypted data by the authentication server, payment information associated with the account; and
providing, by the web browser of the device, the payment information to a payment processor server associated with the on-demand application to process a transaction.

2. The method of claim 1, wherein the selection of the first financial institution comprises:
computing, by the on-demand application, a respective score for each of the plurality of financial institution applications, wherein the first financial institution is associated with a first financial institution application of the plurality of financial institution applications installed on the device.

3. The method of claim 2, wherein the scores are computed based on: (i) an amount of time that has elapsed since the respective financial institution application was used on the device, and (ii) a number of times the respective financial institution application has been used on the device.

4. The method of claim 1, further comprising:
storing, by the web browser, a cookie on the device based on an indication received from the server associated with the application, the indication specifying payment for the transaction has been processed using the payment information.

5. The method of claim 1, further comprising prior to providing the payment information to the payment processor server associated with the on-demand application:
receiving, by the device at a phone number of the device, a one-time passcode from the authentication server;
receiving, by the on-demand application, an input value;
comparing, by the on-demand application, the input value to the one-time passcode; and
determining, by the on-demand application based on the comparison, that the input value matches the one-time passcode, wherein the on-demand application transmits the encrypted data to the authentication server based at least in part on the determination that the input value matches the one-time passcode.

6. The method of claim 1, wherein the URL comprises a first identifier of a first merchant associated with the merchant web page and a transaction identifier associated with the transaction, wherein the first merchant is one of a plurality of merchants, wherein the merchant web page is one of a plurality of merchant web pages on a web server.

7. The method of claim 6, wherein the web server hosts the plurality of merchant web pages, wherein each merchant web page is associated with a respective one of the plurality of merchants, and wherein each merchant is associated with a respective identifier of a plurality of identifiers, the plurality of identifiers including the first identifier.

8. The method of claim 1, wherein the on-demand application is a non-persistent on-demand application, wherein the URL is a deep link uniform resource locator (URL) or a universal link URL.

9. The method of claim 1, wherein a page identifier parameter of the URL identifies a page of the on-demand application, the method further comprising:
    identifying, by the on-demand application, the page identifier parameter; and
    opening, by the on-demand application, the page of the on-demand application based on the page identifier parameter.

10. The method of claim 1, wherein the payment information comprises an account number, an expiration date associated with the account number, and a card verification value (CVV) associated with the account number, the method further comprising, prior to downloading the on-demand application:
    receiving, by the web browser, selection of the URL.

11. A non-transitory computer-readable storage medium, the computer-readable storage medium including instructions that when executed by a processor of a device, cause the processor to:
    receive, from an ecommerce server, a web page including a uniform resource locator (URL), the URL directed to an on-demand application hosted by an application server and the URL including one or more of a merchant identifier associated with the web page and a cart identifier for a transaction;
    download, based on a selection of the URL in a web browser of the device, the on-demand application from the application server;
    select, by the on-demand application, a first financial institution based on a plurality of financial institution applications installed on the device;
    cause a contactless card associated with an account of the first financial institution, to generate encrypted data including a cryptogram by encrypting a customer identifier using a master key of the contactless card;
    receive, by the on-demand application through a communication interface of the device, the encrypted data from the contactless card;
    transmit, by the on-demand application, the encrypted data to an authentication server of the first financial institution;
    receive, by the on-demand application from the authentication server, an authentication result specifying the authentication server decrypted the encrypted data;
    receive, by the web browser of the device based on the decryption of the encrypted data by the authentication server, payment information associated with the account; and
    provide, by the web browser of the device, the payment information to a payment processor server associated with the on-demand application to process a transaction.

12. The computer-readable storage medium of claim 11, wherein the selection of the first financial institution comprises:
    compute, by the on-demand application, a respective score for each of the plurality of financial institution applications, wherein the first financial institution is associated with a first financial institution application of the plurality of financial institution applications installed on the device.

13. The computer-readable storage medium of claim 11, wherein the instructions further cause the processor to:
    receive, by the web browser of the device, a confirmation for the processed transaction; and
    display, by the web browser of the device, the confirmation.

14. The computer-readable storage medium of claim 11, wherein the instructions further cause the processor to:
    store, by the web browser of the device, a cookie on the device based on an indication received from the payment processor server associated with the on-demand application, the indication specifying payment for the transaction has been processed using the payment information.

15. The computer-readable storage medium of claim 11, wherein the instructions further cause the processor to, prior to providing the payment information to the payment processor server associated with the on-demand application:
    receive, by the device at a phone number of the device, a one-time passcode from the authentication server;
    receive, by the on-demand application, an input value;
    compare, by the on-demand application, the input value to the one-time passcode; and
    determine, by the on-demand application based on the comparison, that the input value matches the one-time passcode, wherein the application transmits the encrypted data to the authentication server based at least in part on the determination that the input value matches the one-time passcode.

16. A computing system comprising:
    a contactless card; and
    a computing apparatus comprising a processor; and a memory storing instructions that, when executed by the processor, cause the processor to:
    receive, from an ecommerce server, a web page including a uniform resource locator (URL), the URL directed to an on-demand application hosted by an application server and the URL including one or more of a merchant identifier associated with the web page and a cart identifier for a transaction;
    download, based on a selection of the URL in a web browser of the computing apparatus, the on-demand application from the application server;
    select, by the on-demand application, a first financial institution based on a plurality of financial institution applications installed on the computing apparatus;
    receive, by the on-demand application through a communication interface of the computing apparatus, encrypted data from the contactless card associated with an account of the first financial institution, wherein the contactless card generates the encrypted data including a cryptogram by encrypting a customer identifier using a master key of the contactless card;

transmit, by the on-demand application, the encrypted data to an authentication server of the first financial institution;

receive, by the on-demand application from the authentication server, an authentication result specifying the authentication server decrypted the encrypted data;

receive, by the web browser of the computing apparatus based on the decryption of the encrypted data by the authentication server, payment information associated with the account; and provide, by the web browser of the computing apparatus, the payment information to a payment processor server associated with the on-demand application to process a transaction.

17. The computing system of claim 16, wherein the selection of the first financial institution comprises:

compute, by the on-demand application, a respective score for each of the plurality of financial institution applications, wherein the first financial institution is associated with a first financial institution application of the plurality of financial institution applications installed on the apparatus.

18. The computing system of claim 16, wherein the instructions further cause the processor to:

receive, by the web browser of the computing apparatus, a confirmation for the processed transaction; and display, by the web browser of the computing apparatus, the confirmation.

19. The computing system of claim 16, wherein the instructions further cause the processor to:

store, by the web browser of the computing apparatus, a cookie in the memory based on an indication received from the payment processor server associated with the on-demand application, the indication specifying payment for the transaction has been processed using the payment information.

20. The computing system of claim 16, wherein the instructions further cause the processor to prior to providing the payment information to the payment processor server associated with the on-demand application:

receive, by the apparatus at a phone number of the apparatus, a one-time passcode from the authentication server;

receive, by the on-demand application, an input value;

compare, by the on-demand application, the input value to the one-time passcode; and determine, by the on-demand application based on the comparison, that the input value matches the one-time passcode, wherein the on-demand application transmits the encrypted data to the authentication server based at least in part on the determination that the input value matches the one-time passcode.

* * * * *